(12) United States Patent
Preston et al.

(10) Patent No.: US 11,517,068 B1
(45) Date of Patent: Dec. 6, 2022

(54) REMOVEABLE HELMET COVER AND METHODS OF MANUFACTURE

(71) Applicant: GAME DAY SKINZ INC., Dallas, TX (US)

(72) Inventors: Conner Alan Preston, Dallas, TX (US); Barak Rigbi, Poway, CA (US)

(*) Notice: Subject to any disclaimer, the term of this patent is extended or adjusted under 35 U.S.C. 154(b) by 0 days.

(21) Appl. No.: 17/664,892

(22) Filed: May 25, 2022

Related U.S. Application Data

(60) Provisional application No. 63/192,927, filed on May 25, 2021.

(51) Int. Cl.
| | | |
|---|---|---|
| *A42C 2/00* | (2006.01) | |
| *B29C 64/386* | (2017.01) | |
| *B29C 45/00* | (2006.01) | |
| *B33Y 10/00* | (2015.01) | |
| *B33Y 80/00* | (2015.01) | |
| *A42B 3/00* | (2006.01) | |
| *B33Y 50/00* | (2015.01) | |
| *B29L 31/48* | (2006.01) | |
| *B29K 75/00* | (2006.01) | |

(52) U.S. Cl.
CPC .............. *A42C 2/007* (2013.01); *A42B 3/003* (2013.01); *B29C 45/00* (2013.01); *B29C 64/386* (2017.08); *B33Y 10/00* (2014.12); *B33Y 50/00* (2014.12); *B33Y 80/00* (2014.12); *B29K 2075/00* (2013.01); *B29L 2031/4807* (2013.01)

(58) Field of Classification Search
CPC ........ A42C 2/007; B33Y 10/00; B33Y 50/00; B33Y 80/00; B29C 64/386; B29C 45/00; A42B 3/003; B29K 2075/00; B29L 2031/4807
See application file for complete search history.

(56) References Cited

U.S. PATENT DOCUMENTS

| | | | |
|---|---|---|---|
| 3,155,981 A | 11/1964 | John et al. | |
| 4,599,752 A | 7/1986 | Mitchell | |
| 4,615,438 A | 10/1986 | Rosenberg et al. | |
| 4,937,888 A | 7/1990 | Straus | |
| 5,724,681 A | 3/1998 | Sykes | |
| 6,101,636 A | 8/2000 | Williams | |
| 6,272,692 B1 | 8/2001 | Abraham | |
| 8,166,573 B1 | 5/2012 | Chung et al. | |

(Continued)

FOREIGN PATENT DOCUMENTS

| | | |
|---|---|---|
| WO | 2012037625 A1 | 3/2012 |
| WO | 2012103451 A3 | 1/2013 |

OTHER PUBLICATIONS

International Search Report and Written Opinion, PCT/US2022/072549, dated Aug. 26, 2022, 11 pages.

*Primary Examiner* — Monica A Huson
*Assistant Examiner* — Kelsey C Grace
(74) *Attorney, Agent, or Firm* — Carlson, Caspers, Vandenburgh & Lindquist, P.A.

(57) ABSTRACT

The present invention is directed to injection molded articles as well as methods of manufacture of the same. The injection molded article is a helmet cover for a protective helmet, and more particularly a replaceable helmet cover for enhancing the aesthetic outer appearance of a helmet used in military, construction, manufacturing, and/or contact sports such as American football, baseball, lacrosse, hockey, equestrian, skiing, snowboarding, and the like.

25 Claims, 10 Drawing Sheets

(56) References Cited

U.S. PATENT DOCUMENTS

| | | |
|---|---|---|
| D686,780 S | 7/2013 | Rodgers |
| 8,782,818 B2 | 7/2014 | Ho |
| 8,978,165 B2 | 3/2015 | Franco et al. |
| 9,408,448 B2 | 8/2016 | Kay et al. |
| 9,635,918 B2 | 5/2017 | Kay et al. |
| 9,808,971 B2 | 11/2017 | Fitzpatrick |
| 10,948,898 B1 | 3/2021 | Pietrzak et al. |
| 11,064,752 B2 | 7/2021 | Hanson et al. |
| 2007/0107112 A1 | 5/2007 | Boyd |
| 2008/0222782 A1 | 9/2008 | Stokes |
| 2010/0247868 A1 | 9/2010 | Cha et al. |
| 2012/0285781 A1* | 11/2012 | Bettua ................ A45C 5/14 29/454 |
| 2013/0340149 A1 | 12/2013 | Richwine |
| 2014/0143937 A1 | 5/2014 | Cram |
| 2014/0332417 A1 | 11/2014 | Wicks et al. |
| 2014/0373256 A1 | 12/2014 | Harris |
| 2016/0088891 A1 | 3/2016 | Walsh et al. |
| 2016/0144264 A1 | 5/2016 | Princip et al. |
| 2016/0286886 A1 | 10/2016 | Lytle |
| 2017/0095014 A1 | 4/2017 | King |
| 2018/0163915 A1 | 6/2018 | Halper et al. |
| 2019/0343210 A1 | 11/2019 | Preston et al. |
| 2019/0352446 A1* | 11/2019 | Vontorcik, Jr. ........ B33Y 10/00 |
| 2021/0000209 A1* | 1/2021 | Neubauer ............. A42B 3/063 |

* cited by examiner

REMOVEABLE HELMET COVER AND METHODS OF MANUFACTURE

CROSS-REFERENCE TO RELATED APPLICATIONS

This application claims priority to U.S. Provisional Application No. 63/192,927 filed May 25, 2021, Applicant incorporates by reference herein U.S. Provisional Application No. 63/192,927 in its entirety.

TECHNICAL FIELD

The present invention is directed to injection molded articles as well as methods of manufacture of the same. The injection molded article is a helmet cover for a protective helmet, and more particularly a replaceable helmet cover for enhancing the aesthetic outer appearance of a helmet used in military, construction, manufacturing, and/or contact sports such as American football, baseball, lacrosse, hockey, equestrian, skiing, snowboarding, and the like.

BACKGROUND

Helmets are a standard piece of protective gear in many athletic, industrial, and military applications. For example, helmets are commonly used in contact sports such as American football, baseball, lacrosse, hockey, equestrian, skiing, snowboarding, and the like, and as personal protective equipment in construction, manufacturing, and military contexts.

Each helmet is uniquely shaped to provide protection against the particular impact risks associated with the application as well as to accommodate the user's head size. Helmets often include inner cushioning and outer hardware such as facemasks, chin straps, and trim. In addition, helmets are designed to satisfy any safety requirements and regulations associated with the particular application.

Because of the variety of design and safety considerations associated with creating and manufacturing a helmet, helmets are expensive pieces of safety equipment. As a result, players and other users are typically issued only a single helmet for practice, work, or competition. Even where the helmets are used in industries and programs with larger budgets, such as professional teams, universities, or military units, the cost of a new helmet limits the number of helmets each user is issued.

At the same time, users desire to change the appearance of their uniforms for various reasons, including to highlight "throwback" uniforms, to support particular causes, to honor a particular person or organization, or to celebrate a particular achievement or involvement in notable competitions. There are few options available to users wishing to change the look of their helmets for these purposes. Users can purchase additional helmets, but as previously described this is not an economical choice and most organizations cannot afford to pursue this option.

A helmet may also be painted, covered with adhesive labels or patches, or covered with wraps or multi-piece covers. Each option has drawbacks. For example, painting helmets is time consuming, expensive, and generally requires retention of individuals with training so as to achieve a consistent appearance for all helmets. In addition, painting generally cannot be reversed to restore helmets to their original color unless the helmets are repainted, which requires additional time and expense. Adheive logos and decals do not require high skill level, but expense varies with the quality and size of the decals. Additionally, because of the size and contours of the helmet, decal size and shape is limited to ensure that the decal can be applied without wrinkles, air pockets, or creases—as a result, it is not possible to change the appearance of the entire helmet with this method. Wraps and other multi-piece covers are difficult to place with accuracy and have highly visible seamlines if they are not applied correctly. While some wraps are available as a single piece, they also use adhesive or heating methods for application. Adhesive wraps are difficult to apply because the product can fold and stick to itself, and heating and stretching techniques once again require expensive and time-consuming professional application.

In any of these applications, if the product is not applied with skill and precision, the end result is visually displeasing because there can be variation between helmets, wrinkles, folds, and improper orientation.

SUMMARY

The present invention is directed to injection molded articles as well as methods of manufacture of the same. The injection molded article is a helmet cover for a protective helmet, and more particularly a replaceable helmet cover for enhancing the aesthetic outer appearance of a helmet used in military, construction, manufacturing, and/or contact sports such as American football, baseball, lacrosse, hockey, equestrian, skiing, snowboarding, and the like.

Helmet covers in accordance with the present disclosure are formed from a single piece and therefore require no assembly. Such helmet covers are formed from a single piece while still mainting a snug fit that mimics the shape of the large, irregular, and curvilinear helmet forms used in athletic, industrial, and military applications. These helmet covers are designed to fittably attach to the helmet, and therefore can be applied without adjustment or the use of fasteners. Because such helmet covers are formed from a single piece, they can be applied without visible seams, wrinkles, air pockets, and/or creasing. These helmet covers can be applied and removed quickly, without skill, and without damaging or altering the surface of the helmet. These helmet covers can be made in a variety of colors and designs, and may include decals of nearly any size, shape, and/or color. These helmet covers do not impede the function of the helmet and can withstand the conditions of normal use. The design and manufacture of the helmet covers also allows the helmet covers to be provided at an economical price, thereby increasing the number of times a team may change out its helmet cover design.

As described herein, thermoplastics are used to form the injection molded articles and are employed in the manufacturing process. For convenience, reference to specific types of thermoplastics, such as thermoplastic polyurethane ("TPU"), may be made, but it should be understood that the invention includes all suitable thermoplastics as set forth herein. The present invention provides for a helmet cover. The helmet cover includes a unitary shell assembly that includes a receiving cavity, an interior surface, and an exterior surface. The receiving cavity is configured such that the interior surface of the unitary shell assembly is configured to contact an exterior surface of a helmet and such that the unitary shell assembly fittably and detachably covers the exterior surface of the helmet.

The present invention also provides for a method of manufacturing a helmet cover. The method includes: (A) providing a polymeric injection unit that includes: (i) a barrel-mounted screw assembly, wherein the barrel-mounted screw assembly includes a screw mounted within a barrel; (ii) a processing space, wherein the processing space includes a distal end and a proximal end; and (iii) one or more nozzles in fluid communication with the processing space, wherein the one or more nozzles are located at the distal end of the processing space. The method of manufacturing the helmet further includes (B) providing an injection mold tool, wherein the injection mold tool includes a mold cavity in fluid communication with the one or more nozzles and wherein the injection mold tool is structured so as to form the helmet cover in a single piece. The method of manufacturing the helmet further includes (C) introducing a polymeric material into the processing space. The method of manufacturing the helmet further includes (D) melting the polymeric material within the processing space, wherein the melting is achieved by using the screw mounted within the barrel to mix the polymeric material and applying a heat source to bring the polymeric material to a first predefined temperature and to create a predefined backpressure. The method of manufacturing the helmet further includes (E) injecting a volume of the polymeric material through the one or more nozzles and into the mold cavity, wherein the volume of the polymeric material is sufficient to fill the mold cavity. The method of manufacturing the helmet further includes (F) cooling the polymeric material within the mold cavity to a second predefined temperature. The method of manufacturing the helmet further includes (G) extracting the polymeric material within the mold cavity from the injection mold tool to provide the helmet cover.

The present invention also provides for a method of manufacturing a helmet cover, where the helmet cover includes a unitary shell assembly that includes a receiving cavity, an interior surface, and an exterior surface. The receiving cavity is configured such that the interior surface of the unitary shell assembly is configured to contact an exterior surface of a helmet and such that the unitary shell assembly fittably and detachably covers the exterior surface of the helmet. The method includes (A) providing a polymeric injection unit that includes: (i) a barrel-mounted screw assembly, wherein the barrel-mounted screw assembly includes a screw mounted within a barrel; (ii) a processing space, wherein the processing space includes a distal end and a proximal end; and (iii) one or more nozzles in fluid communication with the processing space, wherein the one or more nozzles are located at the distal end of the processing space. The method of manufacturing the helmet further includes (B) providing an injection mold tool, wherein the injection mold tool includes a mold cavity in fluid communication with the one or more nozzles and wherein the injection mold tool is structured so as to form the helmet cover in a single piece. The method of manufacturing the helmet further includes (C) introducing a polymeric material into the processing space. The method of manufacturing the helmet further includes (D) melting the polymeric material within the processing space, wherein the melting is achieved by using the screw mounted within the barrel to mix the polymeric material and applying a heat source to bring the polymeric material to a first predefined temperature and to create a predefined backpressure. The method of manufacturing the helmet further includes (E) injecting a volume of the polymeric material through the one or more nozzles and into the mold cavity, wherein the volume of the polymeric material is sufficient to fill the mold cavity. The method of manufacturing the helmet further includes (F) cooling the polymeric material within the mold cavity to a second predefined temperature. The method of manufacturing the helmet further includes (G) extracting the polymeric material within the mold cavity from the injection mold tool to provide the helmet cover.

The method of manufacturing the helmet cover can optionally further include that the (B) providing the injection mold tool further include: (i) scanning a helmet to obtain a helmet geometry tile, (ii) altering the helmet geometry file to form a helmet cover geometry file, (iii) printing a 3-dimensional helmet cover prototype, (iv) adjusting the helmet cover geometry file, and (v) creating the injection mold tool using the helmet cover geometry file. The altering the helmet geometry file includes one or more of (a) manipulating a size and/or shape of the helmet cover, (b) modifying a structure of the helmet cover, (c) adding one or more gripping members to the helmet cover, and/or (d) adding a plurality of microholes to the helmet cover. Additionally, the adjusting the helmet cover geometry file can include providing an improved fit of the helmet cover as compared to the 3-dimensional helmet cover prototype.

DETAILED DESCRIPTION

Figure 1:
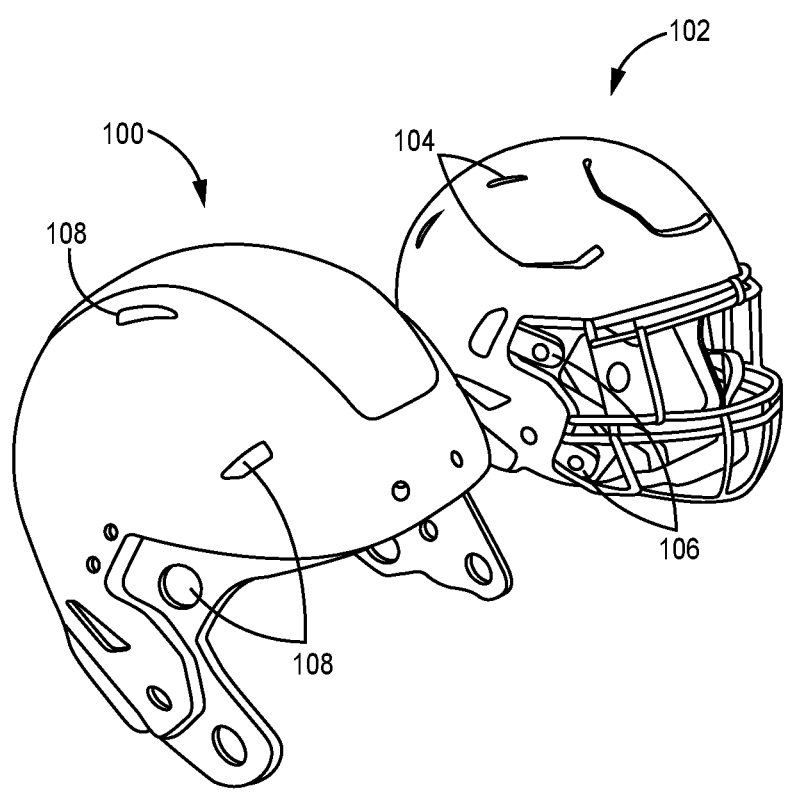
FIG. 1 is an illustration of a helmet cover positioned next to a helmet according to one embodiment of the disclosure.

The present invention can be more readily understood by reading the following detailed description of the invention and study of the included examples.

As used herein, the following terms have the meanings ascribed to them unless specified otherwise.

The terms "comprise," "comprising," "include," "including," and "includes" when used in this specification and claims are intended to specify the presence of the stated materials, substances, features, integers, components, or steps, but they do not preclude the presence or addition of one or more other materials, substances, features, integers, components, steps, or combinations thereof.

The term "about" modifies the subject values, such that they are within an acceptable error range, as determined by one of ordinary skill in the art, which will depend in part on the limitations of the measurement system.

The articles "a" and "an" as used herein refer to "one or more" or "at least one," unless otherwise indicated. That is, reference to any element or component of an embodiment by the indefinite article "a" or "an" does not exclude the possibility that more than one element or component is present.

The term "helmet" as used herein refers to a protective head covering for use in any of a variety of applications, including for sports, personal protective equipment (such as in construction or manufacturing), military, or other applications. The term helmet is intended to include any helmet type, including without limitation helmets used in American football, baseball, lacrosse, hockey, equestrian, skiing, snowboarding, construction, military applications, and the like. Suitable exemplary helmets that are currently commercially available are provided in Example 1. It is appreciated that those of skill in the art would understand that these helmets can be modified over time by the manufacturer and new helmets can enter the market. Any similar helmets or future helmet models would be included within the meaning of the term.

The "helmet cover" as used herein refers to an article for covering a helmet. The helmet cover can be suitable for any helmet type, including without limitation helmets used in American football, baseball, lacrosse, hockey, equestrian, skiing, snowboarding, construction, military applications, and the like. The helmet cover can be used for any suitable purpose, including as a decorative and/or protective covering.

The term "unitary shell assembly" as used herein refers to any number of components that are formed in a single piece during the manufacturing process. As one non-limiting example, in certain embodiments a unitary shell assembly may include a receiving cavity, an interior surface, and an exterior surface all formed from the same thermoplastic, a mixture of thermoplastics, or a mixture of thermoplastics and one or more additives. As another non-limiting example, in certain embodiments a unitary shell assembly may include a receiving cavity, an interior surface, and an exterior surface, all formed in a single mold cavity.

The term "receiving cavity" as used herein refers to a space configured to receive an object with a predefined geometry. As one example, in certain embodiments a receiving cavity may be configured to receive a helmet of any suitable shape and/or size.

The term "interior surface" as used herein refers to a surface that is inward-facing relative to the user.

The terns "exterior surface" as used herein refers to a surface that is outward-facing relative to the user, and includes any surface that is not an interior surface. An exterior surface may have one or more outside edges defining an outer limit of the exterior surface.

The terms "fitted" or "fittably" as used herein refers to a close-fitting, tight, or snug relationship between two objects. In certain embodiments, a "fitted" relationship allows two objects to remain in contact in the absence of a pulling force, either with or without the aid of fasteners or gripping members.

The term "detach" or "detachably" as used herein refers to the ability to separate two objects. In certain embodiments, objects may be detached by the use of a pulling force.

The term "adjustable fastener" as used herein refers to a device for closing or securing an object that can be altered or moved to achieve a desired fit or appearance. Exemplary adjustable fasteners may include, but are not limited to, buckles, straps, screws, clamps, hinges, latches, hooks, and clips.

The term "finish layer" as used herein refers to a surface layer that is applied to an interior or exterior surface of a helmet cover. In certain embodiments the finish layer may include paint, powder coating, graphics, thin film preparations, or a combination thereof. In certain embodiments the finish layer may be applied by painting, bead blasting, etching, UV curing, silk screening, hydrodipping, physical vapor deposition, or a combination thereof.

The terms "adhere," "adheres," or "adhered" as used herein refer to uniting or creating contact between two or more surfaces or materials via molecular interaction.

The term "gripping member" as used herein refers to a component used to grasp or hold an outer edge of an exterior surface.

The term "snappably attaches" as used herein refers to closing or fitting a component in place via an abrupt force and without adjustment.

The term "thermoplastic" as used herein refers to a class of polymers that become pliable or moldable at particular elevated temperatures and become solid upon cooling. Exemplary thermoplastics include, but are not limited to, polyurethane ("TPU"), polypropylene ("PP"), polyethylene ("PE"), polystyrene ("PS"), polyvinyl chloride ("PVC"), poly(methyl methacrylate) ("PMMA"), polycarbonate ("PC"), polyoxymethylene ("POM"), polyethylene vinyl acetate ("PEVA"), high density polyethylene ("HDPE"), acrylonitrile butadiene styrene ("ABS"), polyimide ("PA Nylon"), or mixtures thereof. Different thermoplastics or mixtures of thermoplastics can be used depending on the application, including the desired physical attributes of the finished product. In certain embodiments, the thermoplastic may be a recycled. thermoplastic from scrap product, waste product or other applications.

The term "polymeric material" as used herein refers to an injection molding substrate, which may include one or more thermoplastics and optionally additional additives such as color pigments, glitter, finish surface chemicals, utility additives, and mixtures thereof.

The term thermoplastic polyurethane ("TPU") as used herein refers to a type of thermoplastic created from block copolymers consisting of alternating sequences of hard (high polarity) and soft (low polarity) domains formed by the reaction of diisocyanates with short-chain dials and diisocyanates with long-chain dials. TPUs are generally characterized by high durability, flexibility, and tensile strength.

TPUs are available in a number of hardness grades measured by the TPU's Shore A and/or Shore D value, which is determined according to ASTM D2240. TPUs with a hardness value of about 10A-50A are very soft, TPUs with a hardness value of 50A-80A are soft, TPUs with a hardness value of 80A-90A are midrange, TPUs with a hardness value of 90-95A are hard, and TPUs with a hardness value of 60D-75D are very hard. The term TPU 90 refers to a TPU with a Shore A value of 90. The term TPU95 refers to a TPU with a Shore A value of 95.

Other defining characteristics of a TPU or mixture of TPUs include density (e.g., as measured by ASTM D792), tensile strength and elongation at break (e.g., as measured by ASTM D412), wear volume as measured by ISO4649), tear strength (e.g., as measured by ASTM D624). The most suitable TPU or mixture of TPUs for a particular product will depend upon the application, method of manufacture, and the desired physical attributes of the finished product.

The term "additive(s)" refers to any substance added to a thermoplastic or mixture of thermoplastics to improve, alter, or preserve the attributes of a given article of manufacture. Any number of suitable additives could be used, either alone or in combination, in the embodiments of the present invention, provided the additives achieve their intended purpose (s) and do not adversely impact the performance characteristics of the helmet cover to a significant degree. Exemplary additives include, but are not limited to, color pigments, finish surface chemicals, utility additives, and mixtures thereof. When present, the additives can be employed in any suitable amount, provided the additives achieve their intended purpose(s) and do not adversely impact the performance characteristics of the helmet cover to a significant degree.

The term "thickness" as used herein refers to a distance between opposite surfaces. For example, in certain embodiments the term thickness refers to the distance between an interior surface of a helmet cover and an exterior surface of a helmet cover. While various thicknesses are disclosed, it should be understood that processes for manufacturing articles are subject to natural process variation and, as such, reasonable variances from the desired thickness are within the scope of the present disclosure. For example, irrespective of whether the unitary shell assembly described herein has a single or multiple thicknesses, each of the one or more thickness will typically be between 0.25 mm and 4 mm.

The term "up to" as used herein refers to a value that is less than the indicated value, and is greater than zero (i.e., would not include the value of zero (0)). For example, in reference to the unitary shell assembly described herein having a thickness of up to 4 mm, the thickness would be below 4 mm and would be above zero.

The term "injection molding" or "injection molded" as used herein refers to a manufacturing process for producing articles by injecting molten material into an injection molding tool. Material for the article, such as a thermoplastic or thermoplastic mixture, is fed into a polymeric injection unit, melted, and injected into a mold cavity through nozzles in fluid communication with both the polymeric injection unit and mold cavity, where it is then cooled to configure to the shape of the mold cavity.

The term "polymeric injection unit" as used herein refers to the unit operation for melting a polymeric material during injection molding. Various configurations are known in the art, but the unit generally includes a barrel-mounted screw assembly, a processing space, and one or more nozzles in fluid communication with the processing space. A polymeric injection unit may also include a hopper assembly for introducing the polymeric material into the processing space. In certain embodiments, the hopper assembly includes a conical hopper, a hopper block that is disposed within the processing space for supporting the conical hopper, and optionally a hopper heater and drier for adjusting the moisture content of the polymeric material before feeding. A polymeric injection unit may additionally include a vent or port for reducing the water and/or volatile moisture content of the polymeric material.

The term "barrel-mounted screw assembly" as used herein refers to a cylinder with helical channels that is mounted within the processing space of a polymeric injection unit.

The term "processing space" as used herein refers to a hollow chamber within the polymeric injection unit in which the barrel-mounted screw assembly operates.

The term "nozzle" as used herein refers to a tubular section used to inject polymeric material into the injection mold tool.

The term "injection mold tool" as used herein refers to an assembly of parts that allows melted polymeric material to be formed and cooled so as to create a discrete article of manufacture, such as a helmet cover. An injection mold tool includes a mold cavity.

The term "mold cavity" as used herein refers to the portion of the injection mold tool that imparts a shape of an article of manufacture into the melted polymeric material upon cooling. A mold cavity includes a cavity portion and a core portion, which together provide the shape of the article of manufacture. In the manufacture of a helmet cover, the cavity portion of the mold cavity imparts the shape of an exterior surface of the helmet cover while the core portion imparts the shape of the interior surface of the helmet cover.

The term "in communication with" as used herein refers to the ability to move between two or more units or manufacturing steps. As an example, when one unit or manufacturing step is "in fluid communication with" another unit or manufacturing step, it is meant that a fluid (such as a melted polymeric material) can move between the two units.

The term "predefined" as used herein refers to a setpoint that is established in advance. For example, the term "predefined temperature" refers to desired temperature setpoint. As another example, the term "predefined pressure" refers to desired pressure setpoint. Predefined setpoints may be determined based on the specifications of the manufacturing process, such as the melting point of a polymeric material. While various predefined setpoints are disclosed, it should be understood that processes for manufacturing articles are subject to setpoint variation and, as such, reasonable variances from the desired predefined values are within the scope of the present disclosure.

The term "progressive gradient" as used herein refers to a series of predefined variables that are altered in stages. For example, the term "progressive pressure gradient" refers to a series of predefined pressures that are achieved in sequence. While various predefined setpoints of progressive gradients are disclosed, it should be understood that processes for manufacturing articles are subject to setpoint variation and, as such, reasonable variances from the desired progressive gradients are within the scope of the present disclosure.

The term "backpressure" as used herein refers to the amount of pressure a polymeric material exerts on the barrel-mounted screw assembly during melting.

The term "holding pressure" as used herein refers to the amount of pressure applied during the final stages of filling the mold cavity. In certain embodiments, the holding pressure is applied once the mold cavity is about 90-99 vol. % filled. In certain embodiments, the holding pressure is applied once the mold cavity is about 95-99 vol. % filled. In certain embodiments, the holding pressure is applied once the mold cavity is about 99 vol. % filled.

The term "injecting" as used herein refers to the process of forcing the melted polymeric material through one or more nozzles and into the mold cavity of the injection molding tool.

The term "cooling" as used herein refers to the process of solidifying a melted polymeric material within the mold cavity of the injection molding tool.

The term "extracting" as used herein refers to the process of removing the cooled polymeric material from within the mold cavity of the injection mold tool to provide the desired article of manufacture, such as a helmet cover. Extraction can be performed manually, robotically, or with the use of specialized tools.

The term "helmet geometry file" refers to a computerized model, such as a CAD representation, obtained from a helmet.

The term "helmet cover geometry file" refers to an altered helmet geometry file.

The ten "3-dimensional helmet cover prototype" refers to a physical representation of a helmet cover geometry file obtained by 3-dimensional printing.

The term "altering" refers to changing the structure, design, and/or dimensions of an object.

The term "adjusting" refers to slight manipulations that improve the fit and/or appearance of an object.

Figure 2:
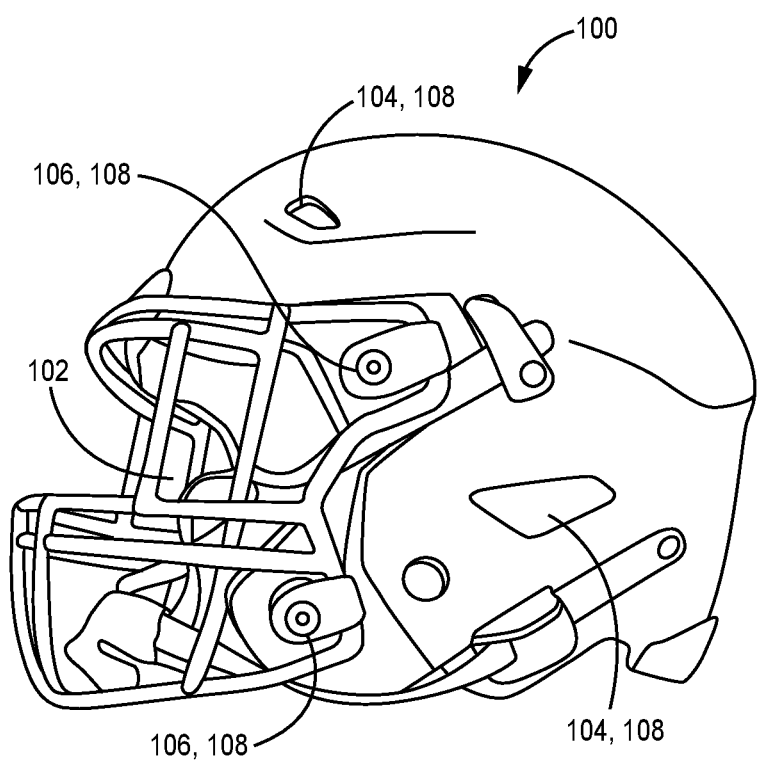
FIG. 2 depicts a helmet cover according to one embodiment of the disclosure.
Figure 3A:
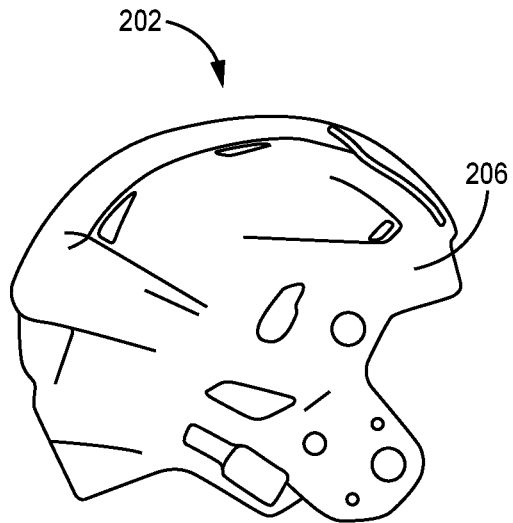
FIG. 3A is a perspective view of the right side of a helmet cover according to one embodiment of the disclosure.
Figure 3B:
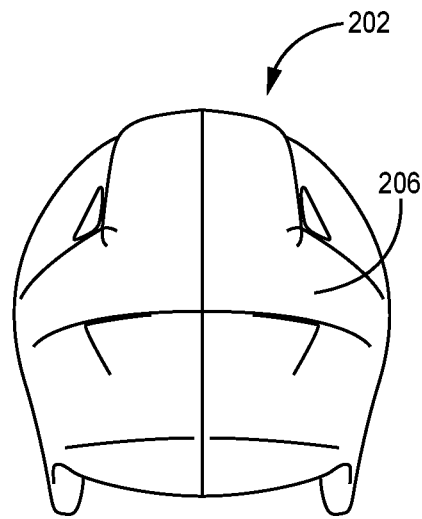
FIG. 3B is a perspective view of the back of a helmet cover according to one embodiment of the disclosure.
Figure 3C:
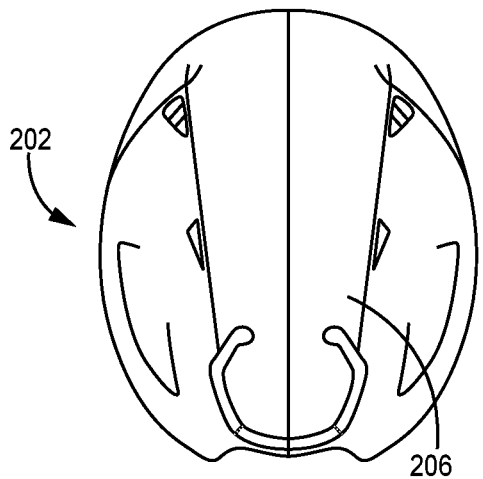
FIG. 3C is a perspective view of the top of a helmet cover according to one embodiment of the disclosure.
Figure 3D:
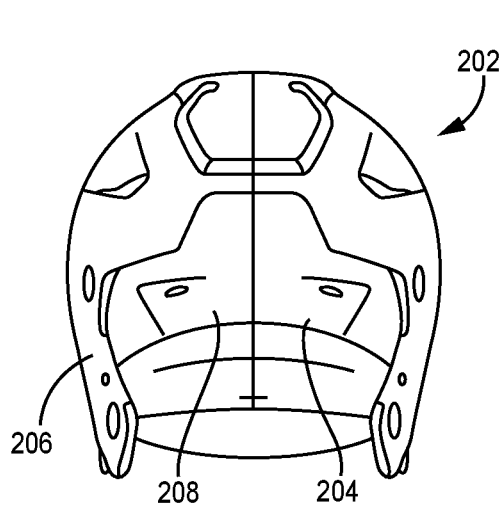
FIG. 3D is a perspective view of the front of a helmet cover according to one embodiment of the disclosure.
Figure 3E:
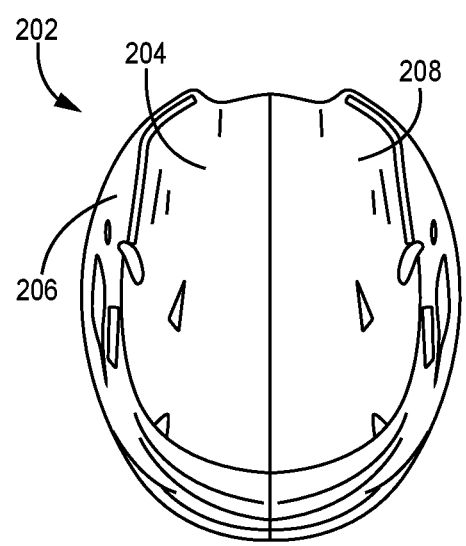
FIG. 3E is a perspective view of the bottom of a helmet cover according to one embodiment of the disclosure.

Referring to FIG. 1, a helmet cover 100 and a helmet 102 are illustrated. Helmet 102 includes one or more helmet openings 104 and one or more helmet fastener locations 106. Helmet cover 100 is designed to have a shape that mirrors the shape of helmet 102, including any helmet openings 104 and helmet fastener locations 106. For example, as shown in FIGS. 1-2, helmet cover 100 includes one or more openings 108 that correspond to helmet openings 104. Similarly, helmet cover 100 includes one or more openings 108 that correspond to helmet fastener locations 106.

As shown in FIGS. 1-2, helmet cover 100 is sized to slide over an exterior surface of the helmet 102 so as to fittably cover the exterior surface of the helmet 102. While the helmet cover 100 can be detached from the helmet 102, the fit between the helmet cover 100 and helmet 102 is such that the helmet cover 102 will not detach from the helmet 100 without application of a pulling force. Because the helmet cover 100 is formed so as to fittably cover the exterior surface of the helmet 102, no adjustable fasteners are required to achieve the desired fit between the helmet cover 100 and helmet 102.

As shown in FIGS. 3A-E, the helmet cover 100 of the present invention includes a unitary shell assembly 202. The unitary shell assembly 202 includes an interior surface 204, an exterior surface 206, and a receiving cavity 208. The receiving cavity 208 has a shape and size that approximately mirrors the shape and size of an exterior surface of the helmet 102.

Figure 4:
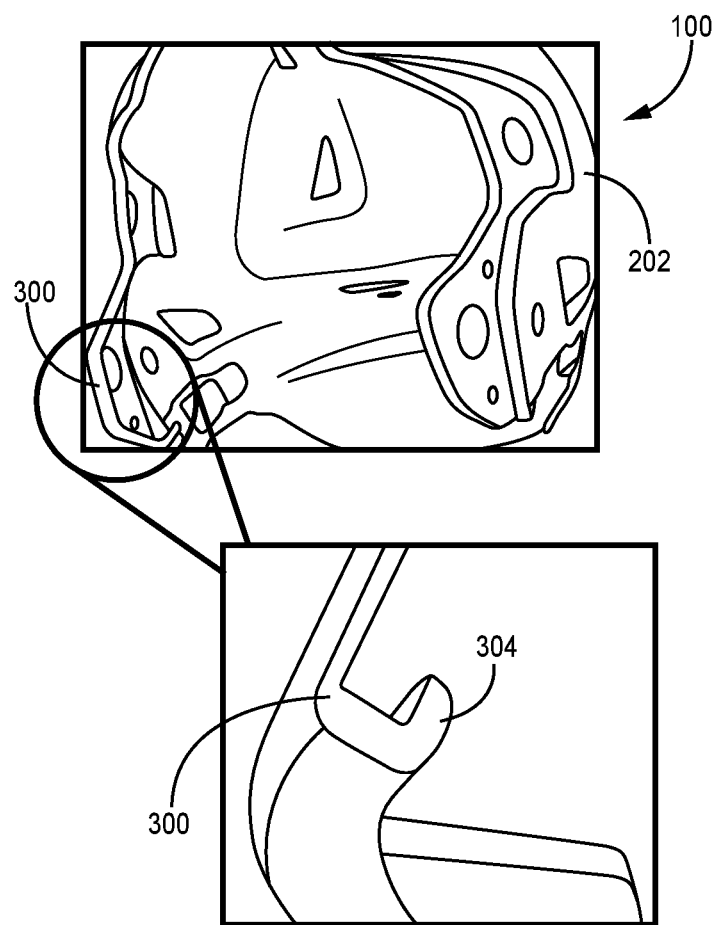
FIG. 4 is a close-up view of an exemplary helmet cover with a gripping member according to one embodiment of the disclosure.

The helmet cover 100 can be made from a thermoplastic, a mixture of thermoplastics, or one or more thermoplastics and one or more additives. Exemplary thermoplastics include polyurethane ("TPU"), polypropylene ("PP"), polyethylene ("PE"), polystyrene ("PS"), polyvinyl chloride ("PVC"), poly(methyl methacrylate) ("PMMA"), polycarbonate ("PC"), polyoxymethylene ("POM"), polyethylene vinyl acetate ("PEVA"), high density polyethylene ("HDPE"), acrylonitrile: butadiene styrene ("ABS"), polyamide ("PA Nylon") or mixtures thereof. For example, helmet cover 100 can be made from one or more TPUs. Exemplary additives include, but are not limited to, color pigments, finish surface chemicals, utility additives, and mixtures thereof. In certain embodiments, helmet cover 100 is made from TPU 90, TPU 95, or mixtures thereof As shown in FIG. 4, in certain embodiments the unitary shell assembly 202 of helmet cover 100 further includes a gripping member 300. Gripping member 300 is formed so as to provide a lip 304 that is sized to accommodate an outer edge of an exterior surface of helmet 102. Gripping member 300 may be designed such that it snappably attaches to an outer edge of an exterior surface of helmet 102, thus providing a secure and partially encompassing fit with said outer edge. The gripping member 300 can designed so as to accommodate all outer edges of an exterior surface of helmet 102, or it may be designed so as to accommodate only certain outer edges of an exterior surface of helmet 102, which outer edges are selected according to the desired appearance of the helmet cover 100.

Figure 5:
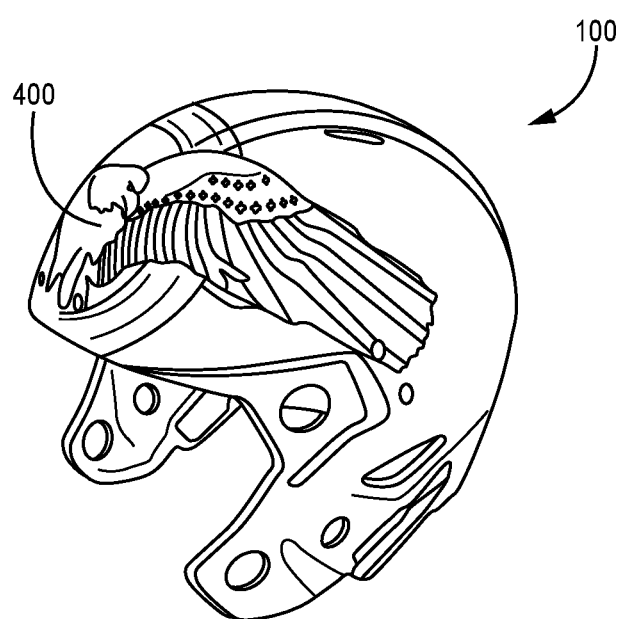
FIG. 5 depicts a helmet cover with a finish layer according to one embodiment of the disclosure.

As shown in FIG. 5, the helmet cover 100 may further include a finish layer 400. It is understood that a person of ordinary skill in the art would be aware of any number of suitable finish layers, and that any such finish layers may be used so long as withstand the forces of application and intended use. For example, the finish layer 400 may include one or more of paint, powder coating, protective coating, graphics, thin film preparations, or a combination thereof The finish layer 400 may be applied by painting, bead blasting, etching, UV curing, silk screening, hydro dipping, physical vapor deposition, or other known application techniques.

The interior surface 204 and/or exterior surface 206 of helmet cover 100 may include a plurality of microholes. When applied to interior surface 204 and/or exterior surface 206 the plurality of microholes may improve the surface characteristics of interior surface 204 and/or exterior surface 206, For example, microholes may alter the coefficient of friction experienced by interior surface 204 and/or exterior surface 206, or may alter the porosity of interior surface 204 and/or exterior surface 206 so as to facilitate adherence of finish layer 400. Microholes may be imparted onto interior surface 204 and/or exterior surface 206 as part of the injection molding process or by mechanical or laser processes after injection molding is complete. The diameter, density, and location of the microholes may be varied to achieve the desired surface characteristics.

The helmet cover 100 of the present invention may be generally manufactured according to known methods for manufacturing articles made from thermoplastics, such as injection molding, thermoforming, or the like.

Figure 6:
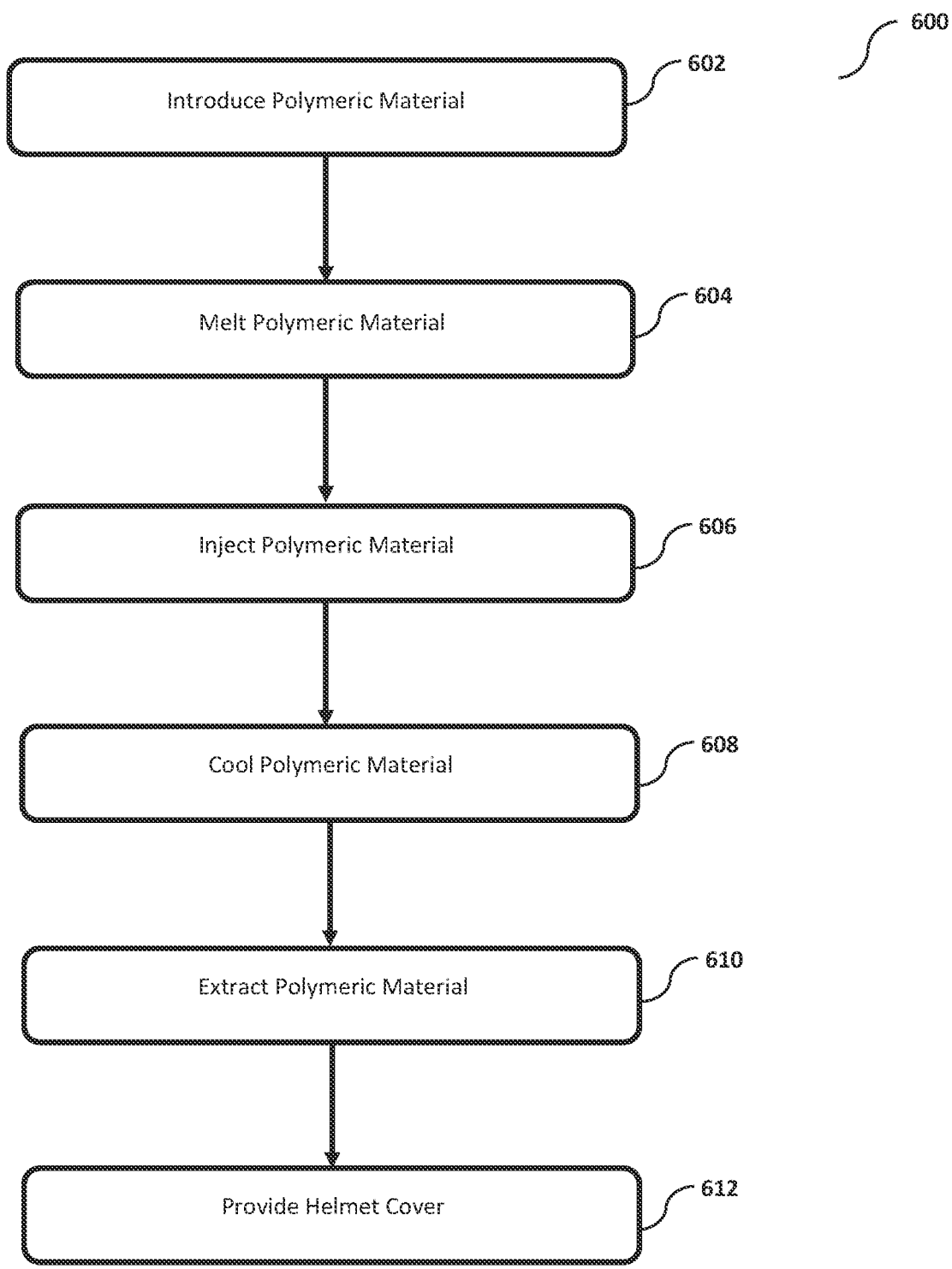
FIG. 6 shows a method of manufacturing a helmet cover according to one embodiment of the disclosure.

For example, helmet cover 100 may be manufactured via an injection molding process. As shown in FIG. 6, the injection molding method 600 includes 602 introducing a polymeric material, 604 melting the polymeric material, 606 injecting the polymeric material, 608 cooling the polymeric material, 610 extracting the polymeric material, and 612 providing a helmet cover.

Figure 7:
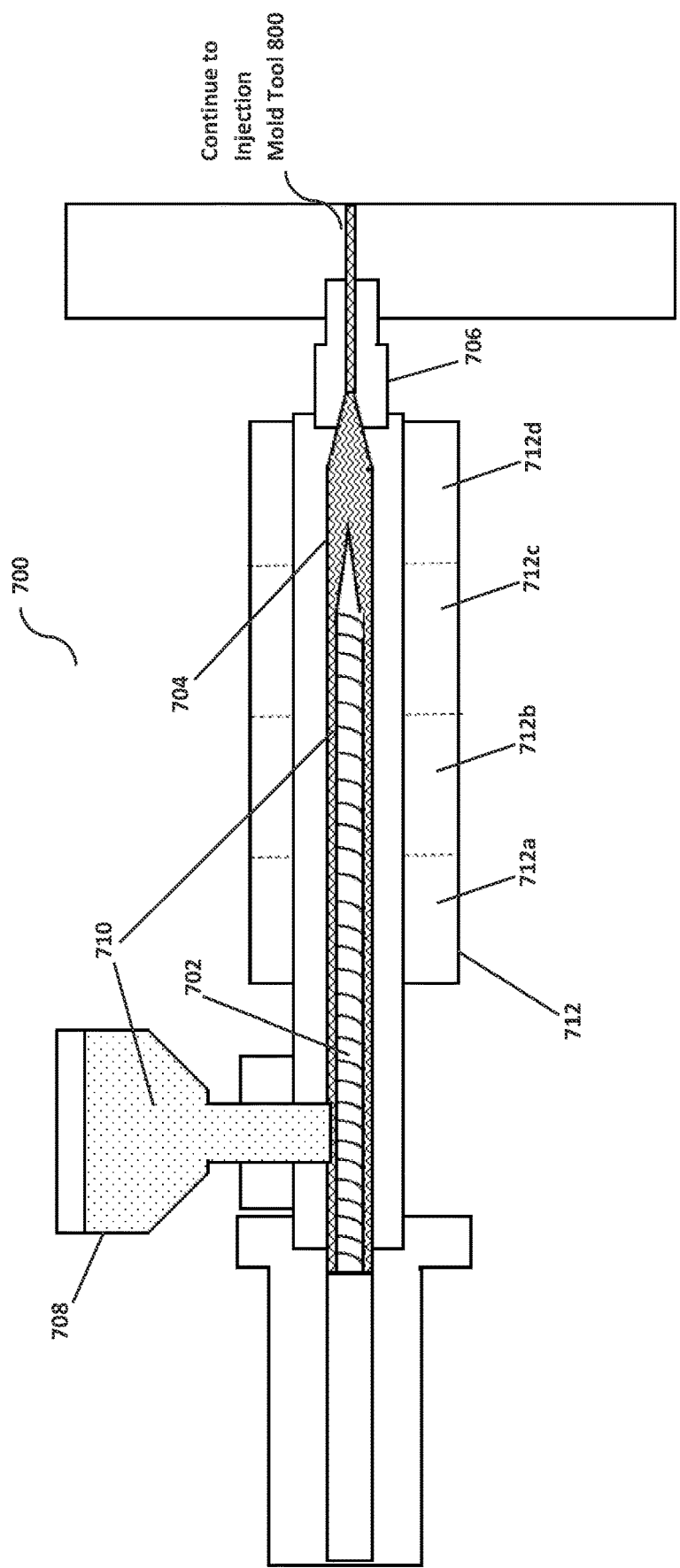
FIG. 7 depicts a polymeric injection unit according to one embodiment of the disclosure.

As shown in FIG. 7, in certain embodiments the step 602 introducing the polymeric material is achieved by feeding the polymeric material 710 into a polymeric injection unit 700. In certain embodiments, the polymeric injection unit 700 includes a processing space 704, a barrel mounted screw assembly 702, and one or more nozzles 706 that are in fluid communication with both processing space 704 and injection mold tool 800. The polymeric injection unit may optionally include a hopper assembly 708 for introducing polymeric material 710 into the processing space 704. Hopper assembly 708 may optionally include a conical hopper, a hopper block that is disposed within the processing space for supporting the conical hopper, and optionally a hopper heater and drier for adjusting the moisture content of the polymeric material before feeding, The polymeric injection unit 700 may also optionally include a vent or port for reducing the water and/or volatile moisture content of the polymeric material 710.

During step 602 introducing the polymeric material, the barrel-mounted screw assembly 702 rotates within the processing space 704 to convey the polymeric material 710 in a proximal-to-distal direction through the processing space, such that the interaction between the barrel-mounted screw assembly and the processing space generally creates an axial (i.e. forward) motion of the polymeric material.

Further referring to FIGS. 6 and 7, during step 604 melting the polymeric material, the barrel-screw mounted screw assembly 702 and the outer limits of the processing space 704 (commonly referred to as the barrel) interact to melt, convey, and impose pressure on the polymeric material so as to prepare the polymeric material 710 for step 606 injecting the polymeric material. To facilitate the interaction, the barrel of the processing space 704 may be partially grooved or entirely grooved depending upon the application, Similarly, the length, diameter, and rotation speed of the barrel-mounted screw assembly 702 can he varied to obtain desired melt properties and consistent output. In certain embodiments, the barrel-mounted screw assembly 702 may include one or more zones wherein the diameter of the screw or the pitch of the helical channels can be varied to effect appropriate feed rate, compression, and metering. Melt uniformity of polymeric material 710 may also be varied by predefining the force generated by the barrel-mounted screw 702, referred to as backpressure.

Processing space 704 may additionally have one or more barrel zones 712, each with its own temperature setpoint, for bringing the polymeric material 710 to a first predefined temperature for step 604 melting the polymeric material. The first predefined temperature may be a particular temperature setpoint or may be a temperature gradient. It should be understood that the temperature setpoint for each of the one or more barrel zones 712 can be varied according to the processing specifications of polymeric material 710.

Where more than one barrel zone 712 is included in the processing space, generally the barrel zone 712 on the proximal end of the processing space (712a) has the lowest temperature set point to prevent premature melting and bridging during step 602 introducing the polymeric material. The temperatures of the remaining barrel zones 712 can then be varied in the direction proceeding from a proximal-to-distal end of the processing space, for example by increasing the barrel zone temperature setpoint in the distal direction. In this manner, the temperature setpoint increases moving from 712a, 712b, 712e, and 712d. For example, in certain embodiments the temperature setpoints may be 200±5° C. for barrel zone 712a, 215±5° C. for barrel zone 712b, 225+5° C. for barrel zone 712e, and 230+5° C. for barrel zone 712d.

Figure 8:
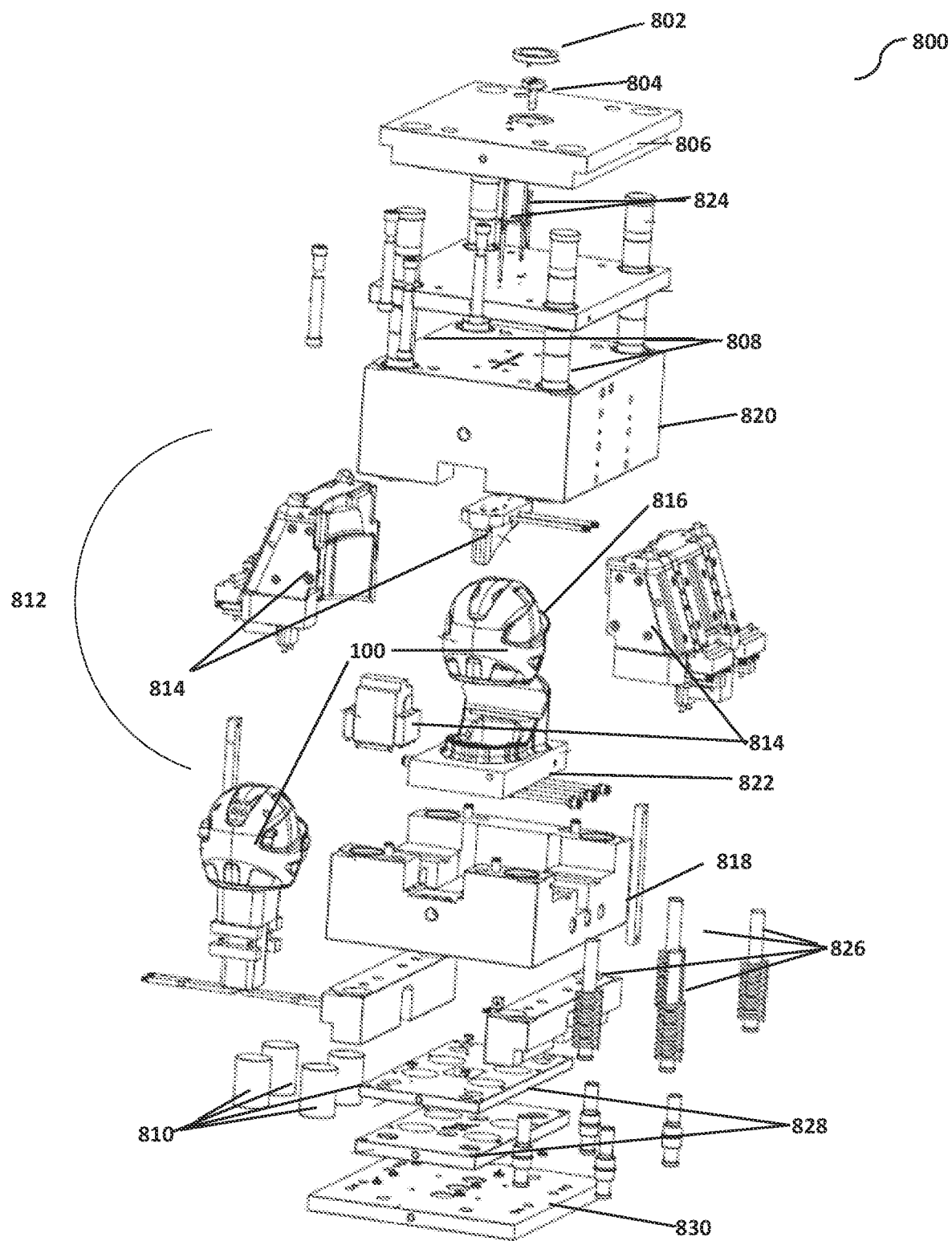
FIG. 8 depicts an injection mold tool according to one embodiment of the disclosure.
Figure 9:
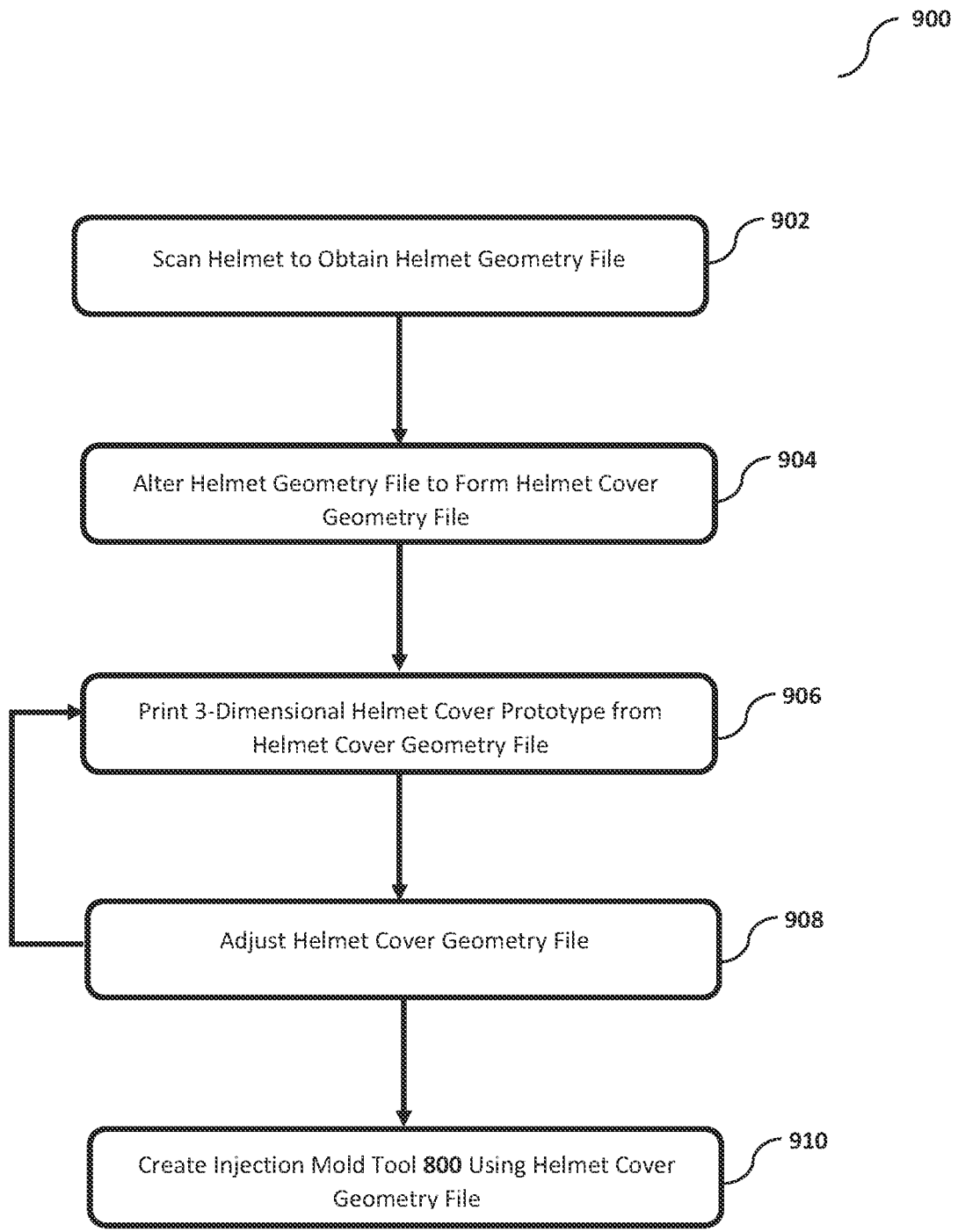
FIG. 9 shows a method of providing an injection mold tool according to one embodiment of the disclosure.

As is also shown in FIGS. 6 and 7, during step 606 injecting the polymeric material, the polymeric material 710 is forced through the one or more nozzles 706 and introduced into injection mold tool 800. As shown in FIG. 8, in certain embodiments injection mold tool 800 includes a locating ring 802, a sprue bushing 804, a spacer plate 806, guide pillars 808 and guide bushes 810, runners 824, a mold cavity 812, stationary plate 818, moveable plate 820, core retaining plate 822, ejector pins 826 and ejector plates 828, and clamp plate 830. The mold cavity 812 includes one or more cavity portions 814 and a core portion 816.

Further referring to FIGS. 6-8, when executing injection molding method 600 the one or more nozzles 706, sprue bushing 804, and runners 824 are in communication such that polymeric material 710 can be forced from processing space 704 and into mold cavity 812, so as to fill mold cavity 812. In certain embodiments, during step 606 injecting the polymeric material, mold cavity 812 is filled in two stages, referred to as a filling/packing stage and a holding stage.

During the filling/packing stage, melted polymeric material 710 is injected under a first progressive pressure gradient. The first progressive pressure gradient is supplied so as to fill the mold and then permit shrinkage and backflow of the melted polymeric material 710. In certain embodiments, the progressive pressure gradient is between about 70 bar and 15 bar.

During the holding stage, the melted polymeric material 710 is held at a specific holding pressure until no additional polymeric material 710 is flowing into mold cavity 812. The holding pressure can be varied according to the processing specifications of the polymeric material 710. and may be a pressure gradient. The holding pressure is applied when mold cavity 812 is between about 90 and 99 vol. % filled.

Returning to FIG. 6. during step 608 cooling the polymeric material, the polymeric material 710 within the mold cavity 812 is cooled to a second predefined temperature. It should be understood that the second predefined temperature may be varied according to the processing specifications of polymeric material 710. The second predefined temperature can be achieved by cooling cavity portions 814 and a core portion 816 to a particular temperature setpoint. The temperature setpoint for cavity portions 814 and core portion 816 can be the same or different depending on the process. For example, the temperature setpoint for cavity portions 814 and core portion 816 may be in the range of 60±10° C.

Continuing with FIG. 6, during step 610 extracting the polymeric material, the helmet cover 100 is removed from the mold cavity 812 and injection mold tool 800. Step 610 extracting the polymeric material can be achieved by use of ejector pins 826 and ejector plates 828, manual extraction, or both. Lastly, during step 612 providing a helmet cover, helmet cover 100 is provided according to the embodiments set forth herein.

As shown in FIG, 9, injection mold tool 800 may be designed and provided via a method of providing a tool 900. In certain embodiments, the method of providing a tool 900 includes 902 scanning helmet 102 to obtain a helmet geometry file, 904 altering the helmet geometry file to form a helmet cover geometry file, 906 printing a 3-dimensional helmet cover prototype from the helmet cover geometry file, 908 adjusting the helmet cover geometry file, and 910 creating an injection mold tool 800 using the helmet cover geometry file.

During step 902 scanning helmet 102 to obtain a helmet geometry file, helmet 102 is scanned to create a computerized model of the helmet 102. In certain embodiments the computerized model may be a CAD STEP file. For example, the helmet geometry file can be created by scanning a helmet 102, obtaining pertinent surface measurements, and generating a CAD model using known methods of surface measurement and surface data output. These methods include generating point cloud or mesh data outputs. Point cloud data is provided by applying pulses of laser light to the surface of an object, measuring the amount of time it takes each pulse to reflect back to the scanner, and using the time measurement to determine the exact position of points of the scanned object. Mesh data is obtained by subdividing the surface structure into sets of polygons that divide continuous surfaces into vertices, edges, and faces that can be represented in the computerized model.

During step 904 altering the helmet geometry file to form a helmet cover geometry file, the helmet geometry file is manipulated to create a helmet cover geometry file. Alterations may include manipulating the size, shape, and/or structure of the helmet 102 depicted in the geometry file. Alterations may also include manipulating the thickness of the helmet geometry file, adding one or more openings to the helmet geometry file, adding one or more gripping members to the helmet geometry file, adding a plurality of microholes to the helmet geometry file, or a combination thereof. The file that results from the alterations applied to the helmet geometry file is referred to as the helmet cover geometry file.

For example, during step 904 altering the helmet geometry file to form a helmet cover geometry file, the helmet geometry file may be altered by manipulating the size and shape of the helmet 102 depicted in the helmet geometry file to obtain the helmet cover geometry file. To manipulate the size, the helmet geometry file is expanded in all directions in an amount that is equivalent to the desired thickness of the helmet cover 100. To manipulate the shape, the expanded helmet geometry file is then modified to shave the interior surface depicted in the helmet geometry file such that the end product has a total thickness equivalent to the desired thickness of the helmet cover 100. Manipulating the size and shape of the helmet geometry file in this manner to create a helmet cover geometry file allows the finished helmet cover 100 to slide over helmet 102 rather than "stacking" on top of helmet 102. The particular type of size and shape manipulations also preserve the helmet-like shape of helmet cover 100, which ensures that helmet cover 100 fits snuggly over helmet 102 despite the large and irregular shape of both helmet cover 102 and helmet 100. Additional alterations such as adding one or more openings to the helmet geometry file, adding one or more gripping members to the helmet geometry file, adding a plurality of microholes to the helmet geometry file, or a combination thereof may then be made to the helmet geometry file. The final product of the alterations is a helmet cover geometry file.

During step 906 printing a 3-dimensional helmet cover prototype from the helmet cover geometry file, a 3-dimensional helmet cover prototype that corresponds to the helmet cover geometry file is provided. The 3-dimensional helmet cover prototype allows the manufacturer to inspect the fit of the 3-dimensional helmet cover prototype when it is applied to helmet 102, and to note any areas that required adjustment. During step 908 adjusting the helmet cover geometry file, the helmet cover geometry file is adjusted to provide an improved fit of helmet cover 100 as compared to the 3-dimensional helmet cover prototype. Steps 906 printing a 3-dimensional helmet cover prototype from the helmet cover geometry file and 908 adjusting the helmet cover geometry file can be repeated as many times as necessary to achieve the desired fit and design of helmet cover 100 when it is applied to helmet 102.

Once the desired fit and design of the helmet cover geometry file is achieved, step 910 creating an injection mold tool 800 using the helmet cover geometry file is executed. The injection mold tool 800 is designed to provide the desired helmet cover 100 while also accommodating for necessary process attributes, such as injection flow, removal of the molded article, temperature and pressure control, and so on. The injection mold tool is designed according to the description set forth herein.

EMBODIMENTS

Helmet Cover

An aspect of the present invention relates to a helmet cover made from a unitary shell assembly including a receiving cavity, an interior surface, and an exterior surface. The receiving cavity is configured such that the interior surface of the unitary shell assembly is configured to contact an exterior surface of a helmet. The unitary shell assembly fittably and detachably covers the exterior surface of the helmet.

Another aspect of the present invention relates to a helmet cover including a unitary shell assembly. The unitary shell assembly includes a receiving cavity, an interior surface, an exterior surface, and a gripping member. The receiving cavity is configured such that the interior surface of the unitary shell assembly is configured to contact an exterior surface of a helmet. The unitary shell assembly fittably and detachably covers the exterior surface of the helmet and snappably attaches to an outside edge of the exterior surface of the helmet via the use of a gripping member.

The specific embodiments describing the components, materials, ranges, values, and steps provided below are for illustration purposes only, and do not otherwise limit the scope of the disclosed subject matter, as defined by the claims.

In various embodiments, the unitary shell assembly fittably and detachably covers the exterior surface of the helmet without the use of an adjustable fastener.

In various embodiments, the helmet cover also includes a finish layer that is adhered to the exterior surface of the unitary shell assembly. The finish layer includes any suitable finish or mixtures of finishes, provided the finish does not interfere with the desired attributes of the helmet cover such as the fit, the ability to apply the finish, the durability of the finish, or the method of manufacture. In certain embodiments the finish layer includes paint, powder coating, graphics, thin film preparations, or a combination thereof. The finish layer may be applied by painting, bead blasting, etching, UV curing, silk screening, hydro dipping, physical vapor deposition, or a combination thereof.

In various embodiments, the unitary shell assembly further includes one or more openings therethrough. The one or more openings may correspond to one or more openings of the helmet. In certain embodiments, one or more openings provide access to various helmet features.

In various embodiments, the unitary shell assembly further includes a gripping member. In certain embodiments, the gripping member snappably attaches to an outside edge of the exterior surface of the helmet, thus providing a secure and partially encompassing fit with said outer edge. The gripping member is formed so as to provide a lip that is sized to accommodate an outer edge of an exterior surface of the helmet. The gripping member can be designed so as to accommodate all outer edges of an exterior surface of the helmet, or it may be designed so as to accommodate only certain outer edges of an exterior surface of the helmet, which outer edges are selected according to the desired appearance and fit of the helmet cover.

In various embodiments, the unitary shell assembly is made from a thermoplastic. In certain embodiments, the thermoplastic is formed via injection molding or thermoforming. In certain embodiments, the thermoplastic is polyurethane ("TPU"), polypropylene ("PP"), polyethylene ("PE"), polystyrene ("PS"), polyvinyl chloride ("PVC"), poly(methyl methacrylate) "PMMA"), polycarbonate ("PC"), polyoxymethylene ("POM"), polyethylene vinyl acetate ("PEVA"), high density polyethylene ("HDPE"), acrylonitrile butadiene styrene ("ABS"), polyamide ("PA Nylon"), or mixtures thereof. For example, the unitary shell assembly may be made from one or more TPUs. In certain embodiments, the TPU is TPU 90, TPU 95, or mixtures thereof.

In various embodiments, the unitary shell assembly is made from a thermoplastic and one or more additives. The one or more additives may include any suitable additive or mixtures of additives, provided the additive does not interfere with the desired attributes of the helmet cover such as the fit, the ability to apply the finish, the durability of the finish, or the method of manufacture. In certain embodiments, the one or more additives can include color pigments, glitter, finish surface chemicals, utility additives, and mixtures thereof. In certain embodiments, utility additives may include graphite, microvacuum balls, or mixtures thereof.

In specific embodiments, the interior surface of the unitary shell assembly and/or the exterior surface of the unitary shell assembly include a plurality of microholes. The plurality of microholes are positioned and sized so as to facilitate insertion of the protective helmet. For example, in certain embodiments, the plurality of microholes are positioned and sized so as to facilitate adherence of a finish layer present on the exterior surface of the unitary shell assembly. The plurality of microholes may cover all or part of the interior surface of the unitary shell assembly and/or the exterior surface of the unitary shell assembly. In certain embodiments, the plurality of microholes preferably each independently have a diameter of between 0.1 µm and 10 µm. In certain embodiments, the plurality of microholes preferably each independently have a diameter of between 0.5 µm and 5 µm. In certain embodiments, the plurality of microholes preferably each independently have a diameter of about 1 µm±0.5 µm. In certain embodiments, the plurality of microholes has a distribution of 3.2e9 to 3.2e5 microholes/cm$^2$. In certain embodiments, the plurality of microholes have a distribution of 1.3e8 to 1.3e6 microholes/cm$^2$. In certain embodiments, the plurality of microholes has a distribution of approximately 3.2e7 microholes/cm$^2$.

As an article of manufacture, the unitary shell assembly of the helmet cover will have a particular thickness. Within the unitary shell assembly, the thickness may vary from one section to another or it may be consistent throughout. Irrespective of whether the unitary shell assembly is single or multiple thicknesses, each of the one or more thicknesses may be between 0.25 mm and 4 mm. For example, each of the one or more thicknesses may be up to 4 mm. Specifically, each of the one or more thicknesses may be up to 3 mm. More specifically, each of the one or more thicknesses may be up to 2 mm. More specifically, each of the one or more thicknesses may be up to 1.75 mm. More specifically, each of the one or more thicknesses may be up to 1.5 mm. More specifically, each of the one or more thicknesses may be up to 1.25 mm.

Likewise, each of the one or more thicknesses may be greater than 0.25 mm. For example, each of the one or more thicknesses may be greater than 0.5 mm. Specifically, each of the one or more thicknesses may be greater than 0.75 mm. More specifically, each of the one or more thicknesses may be greater than 1 mm.

in certain embodiments, the unitary shell assembly has a thickness of 1 mm±0.75 mm. In certain embodiments, the unitary shell assembly has a thickness of 1 mm±0.5 mm. In certain embodiments, the unitary shell assembly has a thickness of 1 mm±0.25 mm. In certain embodiments, the unitary shell assembly has a thickness of 1 mm±0.2 mm. In certain embodiments, the unitary shell assembly has a thickness of 1 mm±0.15 mm. In certain embodiments, the unitary shell assembly has a thickness of 1 mm±0.1 mm. In certain embodiments, the unitary shell assembly has a thickness of 1 mm±0.09 mm. In certain embodiments, the unitary shell assembly has a thickness of 1 mm±0.08 mm. In certain embodiments, the unitary shell assembly has a thickness of 1 mm±0.07 mm. In certain embodiments, the unitary shell assembly has a thickness of 1 mm±0.06 mm. In certain embodiments, the unitary shell assembly has a thickness of 1 mm±0.05 mm. In certain embodiments, the unitary shell assembly has a thickness of 1 mm±0.04 mm. In certain embodiments, the unitary shell assembly has a thickness of 1 mm±0.03 mm. In certain embodiments, the unitary shell assembly has a thickness of 1 mm±0.02 mm. In certain embodiments, the unitary shell assembly has a thickness of 1 mm±0.01 mm. In certain embodiments, the unitary shell assembly has a thickness of about 1 mm.

Method of Manufacturing a Helmet Cover

Another aspect of the present invention is a method of manufacturing a helmet cover including providing a polymeric injection unit with a processing space, providing an injection molding tool that has a mold cavity, introducing a polymeric material into the processing space, melting the polymeric material within the processing space, injecting a volume of the polymeric material into the mold cavity of the injection molding tool, cooling the polymeric material within the mold cavity of the injection molding tool, and extracting the polymeric material from the mold cavity of the injection molding tool to provide a helmet cover.

Another aspect of the present invention is a method of manufacturing a helmet cover. The method includes providing a polymeric injection unit, providing an injection mold tool, introducing a polymeric material into the processing space, melting the polymeric material within the processing space, injecting a volume of the polymeric material, cooling the polymeric material, and extracting the polymeric material to provide a helmet cover.

The polymeric injection unit includes a barrel-mounted screw assembly, a processing space with a distal end and a proximal end, and one or more nozzles in fluid communication with the processing space located at the distal end of the processing space. The polymeric material is melted in the processing space by using the screw mounted within the barrel to mix the polymeric material and applying a heat source to bring the polymeric material to a first predefined temperature and to create a predefined backpressure. Once melted, the polymeric material is injected through the one or more nozzles into the injection mold tool.

The injection mold tool includes a mold cavity in fluid communication with the one or more nozzles, and is structured so as to form the helmet cover in a single piece. When the polymeric material is injected, it is injected in a volume that is sufficient to fill the mold cavity. The polymeric material is then cooled within the mold cavity to a second predefined temperature. Once cooled, the polymeric material is extracted from the mold cavity to provide the helmet cover.

Another aspect of the present invention is a method of providing an injection molding tool. To provide the injection mold tool, a helmet is scanned to obtain a helmet geometry file. The helmet geometry file is altered to form a helmet cover geometry file. Altering the helmet geometry file may include one or more of manipulating a size of the helmet cover, modifying a structure of the helmet cover, adding one or more gripping members to the helmet cover, and/or adding a plurality of microholes to the helmet cover. Using the helmet cover geometry file, a helmet cover prototype is created via 3-dimensional printing. Based on the fit of the helmet cover prototype, the helmet cover geometry file is adjusted to provide an improved fit of the helmet cover as compared to the 3-dimensional helmet cover prototype. The protyping and adjusting steps are repeated until the desired fit and design for the helmet cover is achieved, and then an the injection mold tool is created using the helmet cover geometry file.

The specific embodiments describing the components, materials, ranges, values, and steps provided below are for illustration purposes only, and do not otherwise limit the scope of the disclosed subject matter, as defined by the claims.

In various embodiments, the polymeric material includes a thermoplastic. In certain embodiments, the polymeric material includes a thermoplastic such as polyurethane ("TPU"), polypropylene ("PP"), polyethylene ("PE"), polystyrene ("PS"), polyvinyl chloride ("PVC"), poly(methyl methacrylate) ("PMMA"), polycarbonate ("PC"), polyoxymethylene ("POM"), polyethylene vinyl acetate ("PEVA"), high density polyethylene ("HDPE"), acrylonitrile butadiene styrene ("ABS"), polyamide ("PA Nylon"), or mixtures thereof. For example, the polymeric material may include one or more TPUs. In certain embodiments, the TPU is TPU 90, TPU 95, or mixtures thereof.

In various embodiments, the polymeric material includes a thermoplastic and one or more additives. The one or more additives may include any suitable additive or mixtures of additives, provided the additive does not interfere with the desired attributes of the helmet cover such as the fit, the ability to apply the finish, the durability of the finish, or the method of manufacture. In certain embodiments, the one or more additives can include color pigments, glitter, finish surface chemicals, utility additives, and mixtures thereof. In certain embodiments, utility additives may include graphite, microvacuum balls, or mixtures thereof.

In various embodiments, the method of manufacturing the helmet cover further includes imparting microholes onto the helmet cover. In certain embodiments, the mold cavity is formed so as to impart microholes onto the helmet cover. In certain embodiments, imparting microholes onto the helmet cover is achieved via a mechanical process or laser drilling process after extracting the polymeric material from the mold cavity. The microholes are positioned and sized so as to facilitate insertion of the protective helmet. For example, in certain embodiments, the microholes are positioned and sized so as to facilitate adherence of a finish layer present on the exterior surface of the unitary shell assembly. The microholes may cover all or part of the interior surface of the unitary shell assembly and/or the exterior surface of the unitary shell assembly. In certain embodiments the method of manufacturing the helmet cover further includes imparting microholes having a diameter of between 0.1 μm and 10 μm. In certain embodiments, the method of manufacturing the helmet cover further includes imparting microholes having a diameter of between 0.5 μm and 5 μm. In certain embodiments, the method of manufacturing the helmet cover further includes imparting microholes having a diameter of about 1 μm±0.5 μm. In certain embodiments, the method of manufacturing the helmet cover further includes imparting microholes having a distribution of 3.2e9 to 3.2e5 microholes/cm$^2$. In certain embodiments, the method of manufacturing the helmet cover further includes imparting microholes having a distribution of 1.3e8 to 1.3e6 microholes/cm$^2$. In certain embodiments, the method of manufacturing the helmet cover further includes imparting microholes having a distribution of approximately 3.2e7 microholes/cm$^2$. In various embodiments, microholes may cover all or part of the interior surface of the unitary shell assembly, the exterior surface of the unitary shell assembly, or both.

In various embodiments, the method of manufacturing the helmet cover includes melting the polymeric material within the processing space by bringing the material to a first predefined temperature. In certain embodiments, the first predefined temperature is 230±30° C. In certain embodiments, the first predefined temperature is 230±20° C. In certain embodiments, the first predefined temperature is 230±15° C. In certain embodiments, the first predefined temperature is 230±10° C. In certain embodiments, the first predefined temperature is 230±5° C. In certain embodiments, the first predefined temperature is 230±3° C.

In various embodiments, the method of manufacturing the helmet cover includes melting the polymeric material within the processing space while creating a predefined backpressure. In certain embodiments, the predefined backpressure is less than about 20 bar. In certain embodiments, the predefined backpressure is less than about 15 bar. In certain embodiments, the predefined backpressure is less than about 10 bar. In certain embodiments, the predefined backpressure is 5±1 bar.

In various embodiments, the method of manufacturing the helmet cover includes cooling the polymeric material within the mold cavity to a second predefined temperature. In certain embodiments, the second predefined temperature is 60±10° C. In certain embodiments, the second predefined temperature is 60±8° C. In certain embodiments, the second predefined temperature is 60±6° C. In certain embodiments, the second predefined temperature is 60±4° C. In certain embodiments, the second predefined temperature is 60±2° C.

In various embodiments, the method of manufacturing the helmet cover includes injecting a volume of polymeric material, which is achieved by applying a first progressive pressure gradient. In certain embodiments, the progressive pressure gradient is between about 80 bar and about 10 bar. In certain embodiments, the progressive pressure gradient is between about 70 bar and about 15 bar.

In various embodiments, injecting a volume of the polymeric material occurs in 20±20 seconds. In certain embodiments, injecting a volume of the polymeric material occurs in 20±15 seconds. In certain embodiments, injecting a volume of the polymeric material occurs in 20±10 seconds. In certain embodiments, injecting a volume of the polymeric material occurs in 20±5 seconds.

In various embodiments, cooling the polymeric mated al within the mold cavity occurs in 60±20 seconds. In certain embodiments, cooling the polymeric material within the mold cavity occurs in 60±15 seconds. In certain embodiments, cooling the polymeric material within the mold cavity occurs in 60±10 seconds. In certain embodiments, cooling the polymeric material within the mold cavity occurs in 60±5 seconds.

In various embodiments, the steps of introducing the polymeric material into the processing space, melting the polymeric material within the processing space, injecting a volume of the polymeric material through one or snore nozzles and into the mold cavity, and cooling the polymeric material within the mold cavity occur in 130±40 seconds. In certain embodiments, melting the polymeric material within the processing space, injecting a volume of the polymeric material through one or more nozzles and into the mold cavity, and cooling the polymeric material within the mold cavity occur in 130±30 seconds. In certain embodiments, melting the polymeric material within the processing space, injecting a volume of the polymeric material through one or more nozzles and into the mold cavity, and cooling the polymeric material within the mold cavity occur in 130±20 seconds. In certain embodiments, melting the polymeric material within the processing space, injecting a volume of the polymeric material through one or more nozzles and into the mold cavity, and cooling the polymeric material within the mold cavity occur in 130±10 seconds.

In various embodiments, injecting the volume of the polymeric material through the one or more nozzles and into the mold cavity further includes holding the mold cavity at a holding pressure when the mold cavity is between about 90 and 99 vol. % filled. In certain embodiments, the holding pressure is 100±10 bar. In certain embodiments, the holding pressure is 100±5 bar. In certain embodiments, holding the mold cavity at a holding pressure occurs when the mold cavity is between about 95 and 99 vol. % filled. In certain embodiments, holding the mold cavity at a holding pressure occurs when the mold cavity is about 99 vol. % filled.

Enumerated Embodiments

Specific enumerated Embodiments 1 to 70 provided below are for illustration purposes only, and do not otherwise limit the scope of the disclosed subject matter, as defined by the claims. These enumerated embodiments encompass all combinations, sub-combinations, and multiply referenced (e.g., multiply dependent) combinations described therein.

Enumerated Embodiments for Helmet Cover

Embodiment 1: A helmet cover, wherein the helmet cover includes a unitary shell assembly including a receiving cavity, an interior surface, and an exterior surface, wherein the receiving cavity is configured such that the interior surface of the unitary shell assembly is configured to contact an exterior surface of a helmet and wherein the unitary shell assembly fittably and detachably covers the exterior surface of the helmet.

Embodiment 2: The helmet cover of embodiment 1, where the unitary shell assembly can fittably and detachably cover the exterior surface of the helmet without the use of an adjustable fastener.

Embodiment 3: The helmet cover of embodiment 1, where the helmet cover further includes a finish layer that is adhered to the exterior surface of the unitary shell assembly.

Embodiment 4: The helmet cover of any one of embodiments 1 to 3, where the unitary shell assembly further includes one or more openings therethrough that correspond to one or more openings of the helmet.

Embodiment 5: The helmet cover of any one of embodiments 1 to 4, where the unitary shell assembly further includes a gripping member.

Embodiment 6: The helmet cover of embodiment 5, where the gripping member snappably attaches to an outside edge of the exterior surface of the helmet.

Embodiment 7: The helmet cover of any one of embodiments 1 to 5, where the unitary shell assembly is made from a thermoplastic.

Embodiment 8: The helmet cover of embodiment 7, where the thermoplastic is polyurethane ("TPU"), polypropylene ("PP"), polyethylene ("PE"), polystyrene ("PS"), polyvinyl chloride ("PVC"), poly(methyl methacrylate) ("PMMA"), polycarbonate ("PC"), polyoxymethylene ("POM"), polyethylene vinyl acetate ("PEVA"), high density polyethylene ("HDPE"), acrylonitrile butadiene styrene ("ABS"), polyamide ("PA Nylon"), or a mixture thereof.

Embodiment 9: The helmet cover embodiment 8, where the thermoplastic is TPU.

Embodiment 10: The helmet cover of embodiment 9, where the TPU is TPU 90, TPU 95, or a mixture.

Embodiment 11: The helmet cover of any one of embodiments 1 to 10, where the unitary shell assembly is made from a thermoplastic, wherein the thermoplastic is present in at least 95 wt. %.

Embodiment 12: The helmet cover of any one of embodiments 1 to 11, where the unitary shell assembly is made from a thermoplastic, wherein the thermoplastic is present in at least 99 wt. %.

Embodiment 13: The helmet cover of any one of embodiments 1 to 12, where the unitary shell assembly is made from a thermoplastic, wherein the thermoplastic includes a recycled thermoplastic from a scrap product and/or a waste product.

Embodiment 14: The helmet cover of any one of embodiments 1 to 13, where the unitary shell assembly is made from a thermoplastic and one or more additives.

Embodiment 15: The helmet cover of embodiment 14, where the one or more additives includes color pigments, glitter, finish surface chemicals, utility additives, and mixtures thereof.

Embodiment 16: The helmet cover of any one of embodiments 1 to 15, where the interior surface of the unitary shell assembly, the exterior surface of the unitary shell assembly, or both include a plurality of microholes.

Embodiment 17: The helmet cover of embodiment 16, where the plurality of microholes are applied to less than the entire interior surface of the unitary shell assembly, less than the entire exterior surface of the unitary shell assembly, or both.

Embodiment 18: The helmet cover of any one of embodiments 16 to 17, where the plurality of microholes each independently have a diameter of between 0.1 μm and 10 μm.

Embodiment 19: The helmet cover of any one of embodiments 16 to 18, where the plurality of microholes each independently have a diameter of between 0.5 μm and 5 μm.

Embodiment 20: The helmet cover of any one of embodiments 16 to 19, where the plurality of microholes each independently have a diameter of about 1 μm±0.5 μm.

Embodiment 21: The helmet cover of any one of embodiments 16 to 20, where the plurality of microholes have an average diameter of between 0.1 μm and 10 μm.

Embodiment 22: The helmet cover of any one of embodiments 16 to 21, where the plurality of microholes have an average diameter of between 0.5 μm and 5 μm.

Embodiment 23: The helmet cover of any one of embodiments 16 to 22, where the plurality of microholes have an average diameter of about 1 μm±0.5 μm.

Embodiment 24: The helmet cover of any one of embodiments 16 to 23, where the plurality of microholes has a distribution of 3.2e9 to 3.2e5 microholes/cm$^2$.

Embodiment 25: The helmet cover of any one of embodiments 16 to 24, where the plurality of microholes has a distribution of 1.3e8 to 1.3e6 microholes/cm$^2$.

Embodiment 26: The helmet cover of any one of embodiments 16 to 25, where the plurality of microholes has a distribution of about 3.2e7 microholes/cm$^2$.

Embodiment 27: The helmet cover of any one of embodiments 1 to 26, where the unitary shell assembly has a thickness of between 0.25 mm and 4 mm.

Embodiment 28: The helmet cover of any one of embodiments 1 to 27, where the unitary shell assembly has a thickness of about 1 mm±0.75 mm.

Embodiment 29: The helmet cover of any one of embodiments 1 to 28, where the unitary shell assembly has a thickness of about 1 mm±0.1 mm.

Enumerated Embodiments for Method of Manufacturing a Helmet Cover

Embodiment 30: A method of manufacturing a helmet cover that includes:
A. providing a polymeric injection unit with:
  (i) a barrel-mounted screw assembly, wherein the barrel-mounted screw assembly includes a screw mounted within a barrel;
  (ii) a processing space, wherein the processing space includes a distal end and a proximal end; and
  (iii) one or more nozzles in fluid communication with the processing space, wherein the one or more nozzles are located at the distal end of the processing space;
B. providing an injection mold tool, wherein the injection mold tool includes a mold cavity in fluid communication with the nozzle and wherein the injection mold tool is structured so as to form the helmet cover in a single piece;
C. introducing a polymeric material into the processing space;
D. melting the polymeric material within the processing space, wherein the melting is achieved by using the screw mounted within the barrel to mix the polymeric material and applying a heat source to bring the polymeric material to a first predefined temperature and to create a predefined backpressure;
E. injecting a volume of the polymeric material through the one or more nozzles and into the mold cavity, wherein the volume of the polymeric material is sufficient to fill the mold cavity;
F. cooling the polymeric material within the mold cavity to a second predefined temperature; and
G. extracting the polymeric material within the mold cavity from the injection mold tool to provide the helmet cover.

Embodiment 31: The method of embodiment 30, where helmet cover has the features described in any one of embodiments 1 to 29.

Embodiment 32: The method of any one of embodiments 30 to 31, where the method of manufacturing the helmet cover further includes imparting microholes onto the helmet cover.

Embodiment 33: The method of embodiment 32, where the microholes are applied to less than the entire interior surface of the unitary shell assembly, less than the entire exterior surface of the unitary shell assembly, or both.

Embodiment 34: The method of any one of embodiments 32 to 33, where the microholes each independently have a diameter of between 0.1 μm and 10 μm.

Embodiment 35: The method of any one of embodiments 32 to 34, where the microholes each independently have a diameter of between 0.5 μm and 5 μm.

Embodiment 36: The method of any one of embodiments 32 to 35, where the microholes each independently have a diameter of about 1 μm±0.5 μm.

Embodiment 37: The method of any one of embodiments 32 to 36, where the microholes have an average diameter of between 0.1 μm and 10 μm.

Embodiment 38: The method of any one of embodiments 32 to 37, where the microholes have an average diameter of between 0.5 μm and 5 μm.

Embodiment 39: The method of any one of embodiments 32 to 38, where the microholes have an average diameter of about 1 μm±0.5 μm.

Embodiment 40: The method of any one of embodiments 32 to 39, where the microholes have a distribution of 3.2e9 to 3.2e5 microholes/cm$^2$.

Embodiment 41: The method of any one of embodiments 32 to 40, where the microholes have a distribution of 1.3e8 to 1.3e6 microholes/cm$^2$.

Embodiment 42: The method of any one of embodiments 32 to 41, where the microholes have a distribution of about 3.2e7 microholes/cm$^2$.

Embodiment 43: The method of any one of embodiments 30 to 42, where the method of manufacturing the helmet cover includes melting the polymeric material within the processing space by bringing the material to a first predefined temperature.

Embodiment 44: The method of embodiment 43, where the first predefined temperature is 230±30° C.

Embodiment 45: The method of any one of embodiments 43 to 44, where the first predefined temperature is 230±20° C.

Embodiment 46: The method of any one of embodiments 43 to 45, where the first predefined temperature is 230±15° C.

Embodiment 47: The method of any one of embodiments 43 to 46, where the first predefined temperature is 230±5° C.

Embodiment 48: The method of any one of embodiments 30 to 47, where the method of manufacturing the helmet cover includes melting the polymeric material within the processing space while creating a predefined backpressure.

Embodiment 49: The method of embodiment 48, where the predefined backpressure is less than about 20 bar.

Embodiment 50: The method of any one of embodiments 48 to 49, where the predefined backpressure is less than about 15 bar.

Embodiment 51: The method of any one of embodiments 48 to 50, where the predefined backpressure is about 5±1 bar.

Embodiment 52: The method of any one of embodiments 30 to 51, where the method of manufacturing the helmet cover includes cooling the polymeric material within the mold cavity to a second predefined temperature.

Embodiment 53: The method of embodiment 52, where the second predefined temperature is 60±10° C.

Embodiment 54: The method of any one of embodiments 52 to 53, where the second predefined temperature is 60±8° C.

Embodiment 55: The method of any one of embodiments 52 to 54, where the second predefined temperature is 60±6° C.

Embodiment 56: The method of any one of embodiments 52 to 55, where the second predefined temperature is 60±4° C.

Embodiment 57: The method of any one of embodiments 52 to 56, where the second predefined temperature is 60±2° C.

Embodiment 58: The method of any one of embodiments 30 to 57, where the method of manufacturing the helmet cover includes injecting a volume of polymeric material.

Embodiment 59: The method of embodiment 58, where injecting a volume of polymeric material is achieved by applying a first progressive pressure gradient.

Embodiment 60: The method of embodiment 59, where the progressive pressure gradient is between about 80 bar and about 10 bar.

Embodiment 61: The method of any one of embodiments 59 to 60, where the progressive pressure gradient is between about 70 bar and about 15 bar.

Embodiment 62: The method of any one of embodiments 58 to 61, where injecting a volume of the polymeric material occurs in 20±20 seconds.

Embodiment 63: The method of any one of embodiments 52 to 62, where cooling the polymeric material within the mold cavity occurs in 60±20 seconds.

Embodiment 64: The method of any one of embodiments 58 to 63, where the steps of introducing the polymeric material into the processing space, melting the polymeric material within the processing space, injecting a volume of the polymeric material through one or more nozzles and into the mold cavity, and cooling the polymeric material within the mold cavity occur in 130±40 seconds.

Embodiment 65: The method of any one of embodiments 58 to 64, where injecting the volume of the polymeric material through the one or more nozzles and into the mold cavity further includes holding the mold cavity at a holding pressure when the mold cavity is between about 90 and 99 vol. % filled.

Embodiment 66: The method of any one of embodiments 58 to 65, where injecting the volume of the polymeric material through the one or more nozzles and into the mold cavity further includes holding the mold cavity at a holding pressure when the mold cavity is between about 95 and 99 vol. % filled.

Embodiment 67: The method of any one of embodiments 58 to 66, where injecting the volume of the polymeric material through the one or more nozzles and into the mold cavity further includes holding the mold cavity at a holding pressure when the mold cavity is about 99 vol. % filled.

Embodiment 68: The method of any one of embodiments 65 to 67, where the holding pressure is 100±10 bar.

Embodiment 69: The method of any one of embodiments 30 to 68, where the polymeric material includes a thermoplastic as described in any one of embodiments 7 to 13.

Embodiment 70: The method of any one of embodiments 30 to 69, where the polymeric material includes a thermoplastic as described in any one of embodiments 7 to 13 and one or more additives as described in any one of embodiments 14 to 15.

EXAMPLES

Example 1: The following table provides exemplary commercially available helmets 102 over which helmet cover 100 can be disposed:

| Helmet Type | Brand | Model |
|---|---|---|
| Football | Riddell | Speedflex, Speedflex Precision, Speedflex Youth, Speedflex Icon, Speedflex Icon Youth, Speed Classic, Victor, Civtor-I, Axiom, Foundation, Revolution |
| | Vicis | ZERO2-R Matrix ID Trench, Zero2-R Trench, ZERO2-R, ZERO2-R, ZERO 1 |
| | Xenith | Shadow, Shadow XR, Epic, Epic+ |
| | Schutt | F7 URI, F7 2.0, F7 UR2, F7 CTD II, Air XP Pro, F7N, F7 LTD, Vengeance, Z10, AirXP Pro Q10 |
| Baseball | Easton | Z5 2.0, Pro X, Alpha Solid, Alpha, Youth Z5 2.0, Ghost Fastpitch, Alpha Fastpitch |
| | Evoshield | XVT, XVT Luxe Fitted, XVT Scion, Senior XVT, Junior XVT, Senior VT Scion |
| | Rawlings | 2022 Mach Adjust, Mach Carbon, R16 Reverse, Mach Right, Mach Left, MLB Replica, Velo, Velo 2.0 |
| | Mizuno | MVP Series Solid Youth, B6 Youth, Samurai G4 Youth, MVP, Smurai G4, B6, B6 Fitted, B6 Fastpitch, B6 Batting |
| | Marucci | Duravent |
| | Under Armour | Converge Youth, UA 4 Pro Series Kit (catcher's helmet) |
| | Addidas | Phenom, Phenom 2 |
| Hockey | Bauer | RE-AKT, Vapor, IMS, 4500, 5100, Prodigy, Lil' Sport |
| | CCM | Tacks, Super Tacks, Fitlite |
| | Warrior | Alpha One, Alpha One Pro, Convert PX2, Convert PX+, Convert RS Pro |
| Softball | Easton | Ghost, Alpha Solid |
| | Evoshield | XVT, XVT Luxe Fitted, XVT Scion, Senior XVT, Junior XVT, Senior VT Scion |
| | Mizuno | F6 Youth Fastpitch, MAT Series with Fastpitch Softball, MVP Youth Fastpitch, F6 Fastpitch, F6 Youth Fastpitch, Samurai Women's Fastpitch G4 |
| | Rawlings | Mach Ice Softball |
| | Adidas | Destiny Softball, Signature Series Softball, Incite, Camo |
| Skiing/ Snowboarding | Smith | Prospect Jr. MIPS, Survey JR. MIPS, Icon Jr. MIPS, Counter MIPS, Altus, Icon MIPS, Glide Jr. MIPS, Scout Round Contour, Vantage Round Contour, Scout Jr., Mirage, Glide Jr., Maze MIPS, Counter Jr. MIPS, Vantage, Holt, Scout, Level, Mission, Vantage Women's, Code, Holt Jr., Liberty, Survey MIPS, Quantum, Vida, Altus MIPS, Allure MIPS, Maze Round Contour, Code Round Contour |
| | Bern | Carbon Watts, Watts 2.0 Winter, Winter Macon 2.0, Baker, Bandito Youth Winter, Camino |
| | Giro | Grid Spherical, Jackson MIPS, Orbit Spherical, Ledge MIPS, Neo MIPS, Ledge, Ration MIPS, Emerge Spherical, Union MIPS, Sestriere, Vue MIPS, Neo, Range MIPS, Zone MIPS, Strive, MIPS, Ledge SL MIPS, Trig MIPS, Avance Spherical, Vue MIPS Vivid, |

-continued

| Helmet Type | Brand | Model |
|---|---|---|
| | | Aria Spherical, Envi Spherical, Stellar MIPS, Strata MIPS, Terra MIPS, Fade MIPS, Avera MIPS, Essence MIPS, Avera, Ceva MIPS |
| | Kask | Khimera, Chrome, Firefly, Shadow, Montecarlo, Elite, Flower, Class Sport |
| | Oakley | ARC5, ARC5 Pro, MOD1 Pro, MOD1 Pro SL, MOD1 Youth, MOD1 MIPS, MOD3, MOD3 MIPS, MOD5, MOD5-MIPS, |
| | Poc | Meninx, Meninx RS, Obex BC, Obex Pure, Obex MIPS, Fornix MIPS, Pocito Fornix MIPS, Pocito Skull, Poctio Obex MIPS, Skull Dura X Spin, Skull X Spin, Skull Dura Comp Spin, Super Skull Spin, Skull Dura Jr., Pocito Auric Cut MIPS |
| Lacrosse | Warrior | XRS, S, CPX-R, CPV-R, CS-R, LX |
| | Cascade | Rival, Rival Junior |
| | STX | Covert PX, Covert PX+, Burn, Fatboy Alpha Pro, Burn Junior, Evo Evo Next, PX2, PX2 Pro |
| Bicycle/ Motorcycle | Bontrager | Solstice MIPs, Starvos WaveCel, Solstice, Rally WaveCel, Circuit WaveCel, Quantum MIPS, Charge WaveCEl, Starvos WaveCel Round, Velocis MIPS, Blaze WaveCEl, Jet WaveCel, Specter VaceCel, XXX WaveCel LTD, Blaze WaveCel LTD, Little Dipper MIPS, Tyro, Little Dipper |
| | Lazer | G1 MIPS, Sphere MIPS, Tonic MIPS, Mainframe Youth, Vento Kineticore, Strada Kineticore, G1, Z1 MIPS, Blade+MIPS, Tonic, Jackal Kineticore, Impala MIPS, Coyote MIPS, Chiru MIPS, Compact DLX MIPS, Compact, Cityzen Kineticore, Urbanize MIPS, Volante, Wasp Air Tri, Tardiz2, Nutz Kinteicore, Pnut Kineticore, J1, Gekko MIPS, Lil' Gekko MIPS |
| | Fox Racing | Rampage, Speedframe Rpo, Rampage Comp, Proframe, Dropframe Pro, Speedframe MIPS, Flight |
| | Kask | Mistral, Bambino Pro, Utopia, Wasabi, Valegro, Mojito3, Rapido, Defender, Rex, Caipi, Urban R, Moebius |
| | AGV | Pista, Corsa-R |
| | Arai | RX-7V, Chaser-X |
| | Bell | Pro Star, Race Star, Racestar DLX |
| | HJC | RPHA 11, RPHA1 |
| | Nolan | X802R |
| | Schuberth | S2 Sport, SR2 |
| | Shark | Race-R Pro, Race-R |
| | X-lite | X-803, X-803 RS, X-803 RS Ultra |
| Equestrian | KASK | Dogma, Star Lady, Kooki, Dogma XC, Endurance-R, Dogma Carbon |
| | Charles Owen | Halo, My Halo CX, Luna, My Ayr8, Boyd MS1 Pro, Esme MS1 Prof, Harlow MS1 Pro, Esme JS1 Pro, Ayr8 Plus, Pro II Plus, My PS with MIPS, 4Star, MS1 Pro, Fian, SP8 Plus, Hampton, YR8, JR8, JS1 Pro, Sovereign Polo, Young Rider's Jockey |
| | Samshield | Shadow, Premium, Miss Shield, XC, XJ, XJ Miss |
| | Ovation | Deluxe Schooler, Sync, Protégé, Competitior, Extreme, Venti, Z-6 Elite, Z-6 Glitz, Z-8 Elite II |
| | KEP Italia | Chromo, Chromo 2.0, E-Light, Endurance, Fast, Keppy, Smart |
| | Troxel | Spirit, Intrepid, Liberty, Sport, Sierra, ES |
| Construction | KASK | Zenith, Zenith X, Superplasma, Plasma, HP |
| | MSA | V-Gard C1, V-Gard H1, Skullgard, SmoothDome, Super V, Thermalgard, V-Gard 500, Topgard, Nexus |
| | Milwaukee | Front Brim Safety, Safety Helmet, Full Brim |
| | 3M | SecureFit X5000 Series |
| | Klein Tools | 60145, 60146, 60147, 60148, 60149, 60150 |
| | ERB/ Americana | Americana 360 Helmet, Americana Full Brim Safety Helmet, Americana Vent Cap Safety Helmet, Omega 360, Americana Cap Safety Helmet, Americana HEAT, Omega II |
| | Bullard | Advent A1, Advent A2, Vector, S51, S61, S62, S71, Lite 360, CEN10 |
| | Ergodyne | Skullerz 8975-MIPS, Skullerz 8974-MIPS, Skullerz 8975-V, Skullerz 8974-V, Skullerz 8975LED, Skullerz 8975, Skullerz 8974LED, Skullerz 8974 |

Example 2: The following description provides exemplary process specifications for a method of manufacturing helmet cover 100 via injection molding. Total cycle time for injection molding method 600 using the exemplary process specifications is approximately 130 seconds.

| Step | Exemplary Process Specifications |
| --- | --- |
| Introduce Polymeric Material | Screw size is about 45 mm |
| Melt Polymeric Material | Screw rotation is about 80 rpm<br>First predefined temperature is about 230° C.<br>Barrel zone progressive temperature gradient of about 200° C., 215° C., 225° C., 230° C.<br>Backpressure is about 5 bar |
| Inject Polymeric Material | First predefined pressure gradient is about 20 bar, 15, bar, 70 bar, 28 bar<br>Filling/packing stage time is about 20 seconds<br>Decompression is about 5 mm<br>Cushion is about 30 mm<br>Holding pressure gradient is 30 bar, 9 bar, 25 bar<br>Final holding pressure is 100 bar when mold is 99 vol. % filled<br>Holding speed is 9 mm/sec<br>Holding stage time at 99 vol. % fill is about 17 seconds |
| Cool Polymeric Material | Second predefined temperature is about 60° C.<br>Cooling setting on cavity is about 60° C.<br>Cooling setting on core is about 60° C.<br>Cooling step time is about 60 seconds |
| Extract Polymeric Material | Ejector stroke is about 80 mm |

Example 3: The following table provides exemplary specifications for a polymeric material (TPU 95) for use in a method of manufacturing helmet cover 100 via injection molding.

| | Exemplary TPU Specifications | | |
| --- | --- | --- | --- |
| Performance Attribute | Testing Method | Specification (Value) | Specification (Range) |
| Hardness | ASTM DD20 | 95 ShoreA | 85-105 ShoreA |
| Density | ASTM D792 | 1.20 g/cm³ | 1.20 ± 1.2 g/cm³ |
| Tensile Strength | ASTM D412 | 35 MPa | 35 ± 3.5 MPa |
| 100% Tensile Strength | ASTM D412 | 13 MPa | 13 ± 1.3 MPa |
| 300% Tensile Strength | ASTM D412 | 22 MPa | 22 ± 2.2 MPa |
| Elongation at Break | ASTM D412 | 450 % | 450 ± 45% |
| Wear Volume | ISO 4649 | 40 mm³ | 40 ± 4 mm3 |
| Tear Strength | ASTM D624 | 120 N/mm | 120 ± 12 N/mm |

What is claimed is:

1. A method of manufacturing a helmet cover, wherein the helmet cover comprises a unitary shell assembly comprising a receiving cavity, an interior surface, and an exterior surface, wherein the receiving cavity is configured such that the interior surface of the unitary shell assembly is configured to contact an exterior surface of a helmet and wherein the unitary shell assembly fittably and detachably covers the exterior surface of the helmet, the method comprising:
   A. providing a polymeric injection unit comprising:
      (i) a barrel-mounted screw assembly, wherein the barrel-mounted screw assembly comprises a screw mounted within a barrel;
      (ii) a processing space, wherein the processing space comprises a distal end and a proximal end; and
      (iii) one or more nozzles in fluid communication with the processing space, wherein the one or more nozzles are located at the distal end of the processing space;
   B. providing an injection mold tool, wherein the injection mold tool comprises a mold cavity in fluid communication with the one or more nozzles, wherein the injection mold tool is structured so as to form the helmet cover in a single piece, and wherein providing the injection mold tool comprises at least the following steps;
      (i) scanning the helmet o obtain a helmet geometry file;
      (ii) altering the helmet geometry file to form a helmet cover geometry file;
      (iii) printing a 3-dimensional helmet cover prototype;
      (iv) adjusting the helmet cover geometry file; and
      (v) creating the injection mold tool using the helmet cover geometry file,
         wherein altering the helmet geometry file includes one or more of manipulating a size of the helmet cover, manipulating a shape of the helmet cover, modifying a structure of the helmet cover, adding one or more gripping members to the helmet cover, adding a plurality of microholes to the helmet cover, or a combination thereof; and
         wherein adjusting the helmet cover geometry file includes providing an improved fit of the helmet cover as compared to the 3-dimensional helmet cover prototype;
   C. introducing a polymeric material into the processing space;
   D. melting the polymeric material within the processing space, wherein the melting is achieved by using the screw mounted within the barrel to mix the polymeric material and applying a heat source to bring the polymeric material to a first predefined temperature and to create a predefined backpressure;
   E. injecting a volume of the polymeric material through the one or more nozzles and into the mold cavity, wherein the volume of the polymeric material is sufficient to fill the mold cavity;
   F. cooling the polymeric material within the mold cavity to a second predefined temperature; and
   G. extracting the polymeric material within the mold cavity from the injection mold tool to provide the helmet cover.

2. The method of claim 1, wherein the polymeric material is a thermoplastic polyurethane (TPU).

3. The method of claim 1, wherein the polymeric material is selected from the group consisting of TPU 90, TPU 95, and a mixture thereof.

4. The method of claim 1 wherein the polymeric material is TPU and optionally one or more additives selected from the group consisting of color pigments, finish surface chemicals, utility additives, and mixtures thereof.

5. The method of claim 1, wherein the mold cavity is formed so as to impart microholes onto the helmet cover.

6. The method of claim 1, wherein the first predefined temperature is 230 ±3° C.

7. The method of claim 1, wherein the predefined backpressure is 5±1 bar.

8. The method of claim 1, wherein the second predefined temperature is 60±2° C.

9. The method of claim 1, wherein injecting the volume of the polymeric material is achieved by applying a first progressive pressure gradient and wherein the progressive pressure gradient is between about 70 bar and 15 bar.

10. The method of claim 1, wherein injecting a volume of the polymeric material occurs in 20±5 seconds.

11. The method of claim 1, wherein cooling the polymeric material within the mold cavity occurs in 60±5 seconds.

12. The method of claim 1, wherein the steps of introducing the polymeric material into the processing space, melting the polymeric material within the processing space, injecting a volume of the polymeric material through one or more nozzles and into the mold cavity, and cooling the polymeric material within the mold cavity occur in 130±20 seconds.

13. The method of claim 1, wherein injecting the volume of the polymeric material through the one or more nozzles and into the mold cavity further comprises holding the mold cavity at a holding pressure of 100 bar when the mold cavity is 99 vol. % filled.

14. The method of claim 1, wherein the unitary shell assembly fittably and detachably covers the exterior surface of the helmet without the use of an adjustable fastener.

15. The method of claim 1, wherein the helmet cover further comprises a finish layer, and wherein the finish layer is adhered to the exterior surface of the unitary shell assembly.

16. The method of claim 1, wherein the unitary shell assembly further comprises one or more openings therethrough and wherein the one or more openings correspond to one or more openings of the helmet.

17. The method of claim 1, wherein the unitary shell assembly further comprises a gripping member and wherein the gripping member snappably attaches to an outside edge of the exterior surface of the protective helmet.

18. The method of claim 1, wherein the unitary shell assembly comprises a plurality of microholes, and wherein the plurality of microholes each independently have a diameter of between about 1 μm±0.5 μm.

19. The method of claim 1, wherein the unitary shell assembly has a thickness of between 0.25 mm and 4 mm.

20. The method of claim 1, wherein scanning the helmet to obtain a helmet geometry file comprises obtaining one or more surface measurements of the helmet and generating a computer model using the one or more surface measurements of the helmet.

21. The method of claim 1, wherein the unitary shell assembly has a desired thickness and wherein altering the helmet geometry file by manipulating a size of the helmet cover comprises expanding the helmet geometry file in all directions in an amount that is equivalent to the desired thickness of the unitary shell assembly.

22. The method of claim 1, wherein the unitary shell assembly has a desired thickness, wherein altering the helmet geometry file by manipulating a size of the helmet cover comprises expanding the helmet geometry file in all directions in an amount that is equivalent to the desired thickness of the unitary shell assembly, and wherein altering the helmet geometry file by manipulating a size of the helmet cover further comprises shaving the interior surface of the helmet cover such that the resulting helmet cover geometry file has a thickness that is equivalent to the desired thickness of the unitary shell assembly.

23. The method of claim 1, wherein adjusting the helmet cover geometry file is repeated until the 3-dimensional helmet cover prototype fittably and detachably covers the exterior surface of the helmet.

24. The method of claim 1, wherein creating the injection mold tool using the helmet cover geometry file further comprises modifying the injection mold tool to accommodate for one or more process attributes.

25. The method of claim 1, wherein creating the injection mold tool using the helmet cover geometry file further comprises modifying the injection mold tool to accommodate for one or more process attributes, and wherein the one or more process attributes comprise one or more of injection flow, removal of the helmet cover from the mold cavity, temperature control, pressure control, or a combination thereof.

* * * * *